United States Patent
Okada et al.

(10) Patent No.: US 8,701,605 B2
(45) Date of Patent: Apr. 22, 2014

(54) SPARK IGNITION TYPE INTERNAL COMBUSTION ENGINE

(75) Inventors: Yoshihiro Okada, Susono (JP); Rikikazu Hayashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 13/121,288

(22) PCT Filed: Apr. 28, 2009

(86) PCT No.: PCT/JP2009/058730
§ 371 (c)(1),
(2), (4) Date: Apr. 5, 2011

(87) PCT Pub. No.: WO2010/125694
PCT Pub. Date: Nov. 4, 2010

(65) Prior Publication Data
US 2012/0031377 A1    Feb. 9, 2012

(51) Int. Cl.
*F02D 15/00*    (2006.01)
*F02D 15/04*    (2006.01)
*F02D 13/02*    (2006.01)
*F02B 75/04*    (2006.01)
*F02D 23/00*    (2006.01)

(52) U.S. Cl.
CPC ............ *F02D 15/04* (2013.01); *F02D 13/0226* (2013.01); *F02D 23/00* (2013.01); *F02B 75/041* (2013.01)
USPC ..................... 123/48 C; 123/90.15; 123/78 C; 123/48 R; 123/78 R

(58) Field of Classification Search
CPC . F02D 13/0223; F02D 13/0226; F02D 15/04; F02D 23/005; F02D 23/00; F02D 23/02; F02B 43/00
USPC ................ 123/48 R, 48 A, 48 AA, 48 C, 347
See application file for complete search history.

(56) References Cited

U.S. PATENT DOCUMENTS

| 4,930,315 A | * | 6/1990 | Kanesaka ........................ 60/600 |
| 6,725,660 B2 | * | 4/2004 | Hidaka ........................... 60/602 |
| 2009/0187329 A1 | | 7/2009 | Akihisa et al. |

FOREIGN PATENT DOCUMENTS

| JP | A-2004-218522 | | 8/2004 | |
| JP | 2004-218522 | * | 9/2004 | .............. F02B 37/00 |

(Continued)

OTHER PUBLICATIONS

Nov. 22, 2011 Translation of International Preliminary Report on Patentability issued in International Application No. PCT/JP2009/058730.

(Continued)

*Primary Examiner* — Lindsay Low
*Assistant Examiner* — Kevin Lathers
(74) *Attorney, Agent, or Firm* — Oliff PLC

(57) ABSTRACT

A spark ignition type internal combustion engine of the present invention is provided with a variable compression ratio mechanism able to change a mechanical compression ratio, a variable valve timing mechanism able to control a closing timing of an intake valve, and a supercharger. At the time of engine low load operation, the mechanical compression ratio is made higher compared with at the time of engine high load operation. At the time of engine medium load operation, the supercharging action of the supercharger is used to make the pressure inside the intake pipe rise so that the intake air amount fed into a combustion chamber is increased, compared with at the time of engine low load operation, and the mechanical compression ratio is lowered to make the actual compression ratio fall.

12 Claims, 13 Drawing Sheets

(56) References Cited

FOREIGN PATENT DOCUMENTS

| JP | A-2007-303423 | | 11/2007 | |
| JP | 2008-019799 | * | 1/2008 | ............. F02D 15/04 |
| JP | 2008019799 A | * | 1/2008 | ............. F02D 15/04 |
| JP | A-2008-019799 | | 1/2008 | |
| JP | A-2008-196407 | | 8/2008 | |
| JP | A-2009-046999 | | 3/2009 | |
| WO | WO 2008/007488 A1 | | 1/2008 | |
| WO | WO 2009/022751 A1 | | 2/2009 | |

OTHER PUBLICATIONS

International Search Report issued in International Application No. PCT/JP2009/058730 on Jun. 23, 2009 (with translation).

* cited by examiner

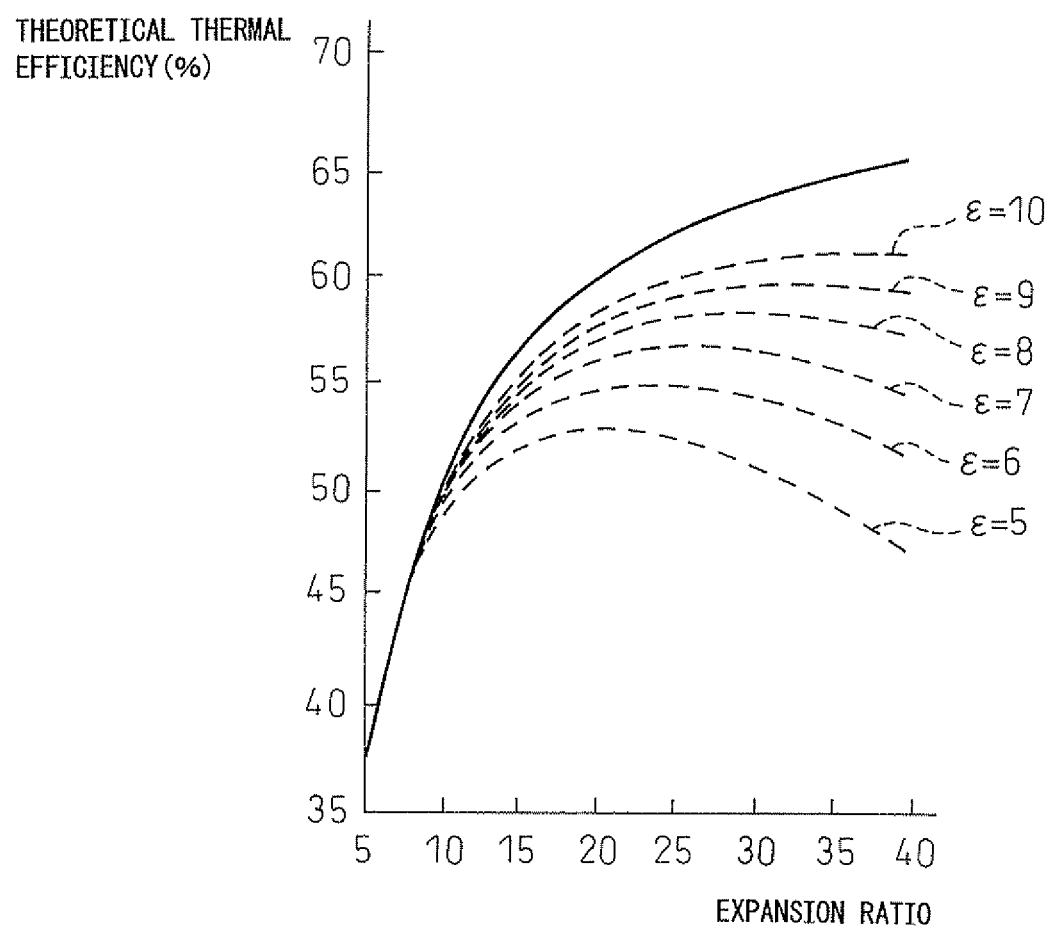

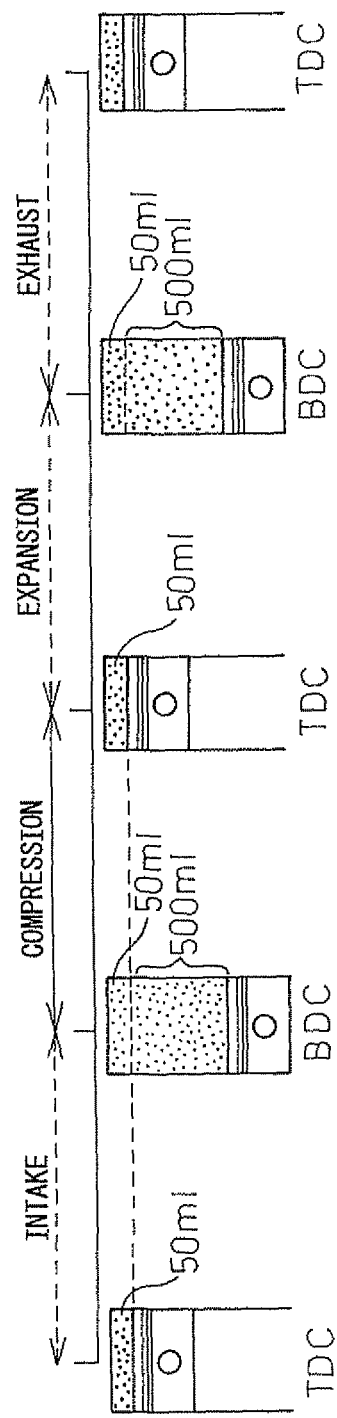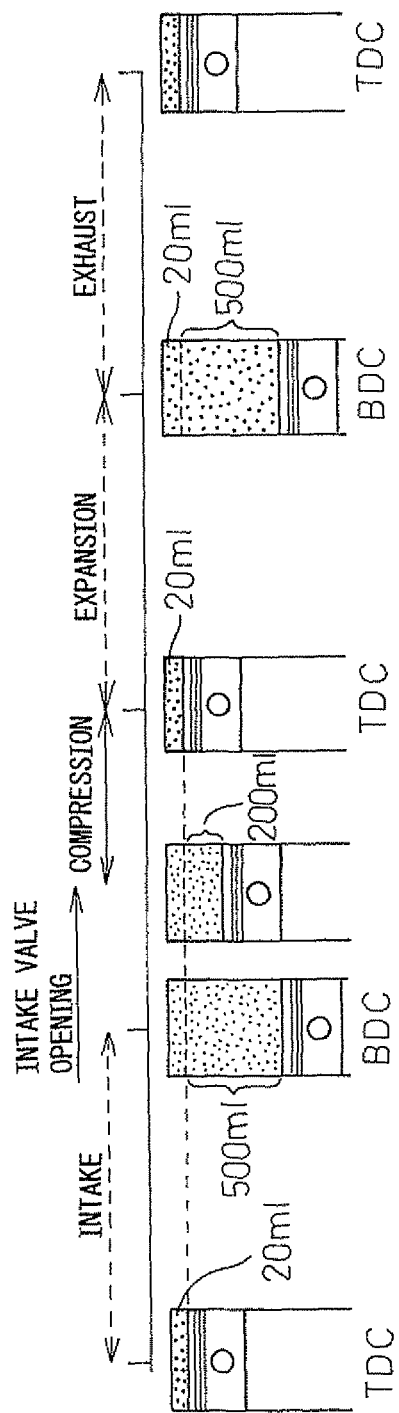

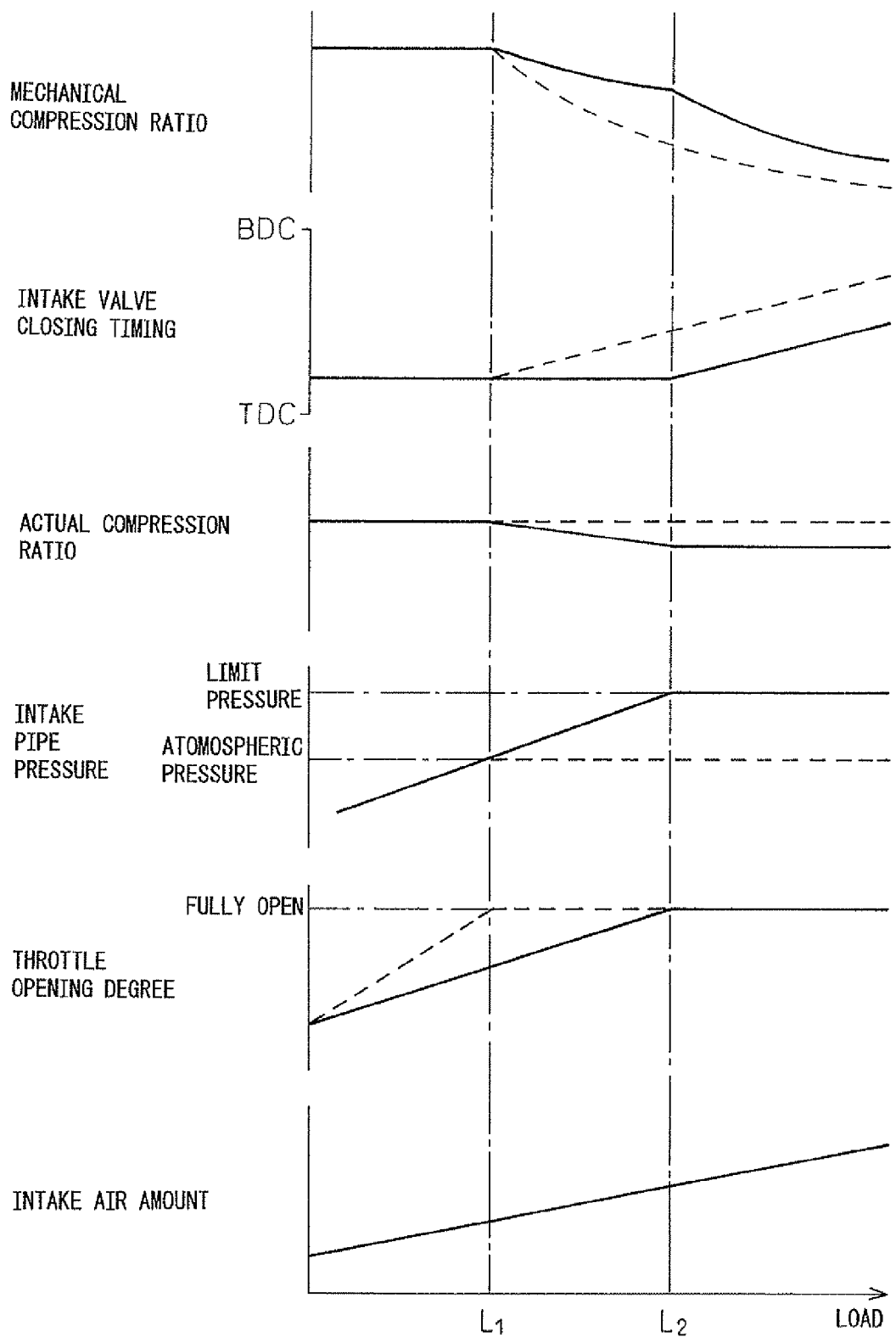

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, wherein the amount of intake air fed into a combustion chamber is controlled by changing the closing timing of the intake valve, and the mechanical compression ratio at the time of engine low load operation is made higher compared with at the time of engine high load operation (for example, PLT 1).

In particular, in the spark ignition type internal combustion engine described in PLT 1, the amount of intake air fed into a combustion chamber is controlled by changing the closing timing of the intake valve, so at the time of engine medium and high load operation, the closing timing of the intake valve is made to advance along with an increase of the engine load. Further, when making the closing timing of the intake valve advance to increase the amount of intake air fed into a combustion chamber in this way, if maintaining the mechanical compression ratio constant, the occurrence of knocking is invited, so at the time of engine medium and high load operation, the mechanical compression ratio is made to drop along with the advance of the closing timing of the intake valve.

CITATION LIST

Patent Literature

PLT 1: Japanese Patent Publication (A) No. 2007-303423

SUMMARY OF INVENTION

Technical Problem

In this regard, in the spark ignition type internal combustion engine described in PLT 1, as explained above, at the time of engine medium load operation, the closing timing of the intake valve is made to advance so as to make the amount of intake air fed into the combustion chamber increase and, along with this, the mechanical compression ratio is lowered so that the actual compression ratio becomes constant. However, if lowering the mechanical compression ratio, simultaneously, the expansion ratio is made to fall. Such a drop in the expansion ratio invites a drop in the heat efficiency and as a result ends up causing deterioration of the fuel consumption.

Therefore, in view of the above problem, an object of the present invention is to provide a spark ignition type internal combustion engine suppressing the drop in the heat efficiency accompanying a drop in the mechanical compression ratio at the time of engine medium load operation.

Solution to Problem

The present invention provides a control system of an internal combustion engine described in the claims as the solution to the above problem.

In a first aspect of the present invention, there is provided a spark ignition type internal combustion engine provided with a variable compression ratio mechanism able to change a mechanical compression ratio, a variable valve timing mechanism able to control a closing timing of an intake valve, and a supercharger, wherein, at the time of engine low load operation, the mechanical compression ratio is made higher compared with at the time of engine high load operation, wherein, at the time of engine medium load operation, the supercharging action of the supercharger is used to raise a pressure inside an intake pipe so that the amount of intake air fed into a combustion chamber is made to rise, compared with at the time of engine low load operation, and the mechanical compression ratio is made to fall so that the actual compression ratio is made to fall.

According to the first aspect, at the time of engine medium load operation, the supercharging action of the supercharger is used to make the pressure inside the intake pipe rise compared with at the time of engine low load operation and thereby make the amount of intake air fed into a combustion chamber increase. For this reason, compared with when making the amount of intake air fed into a combustion chamber increase only by making the closing timing of the intake valve advance, the extent by which the mechanical compression ratio is made to fall is small at the time of engine medium load operation. For this reason, it is possible to keep down the drop in the expansion ratio and along with this possible to suppress a drop in the heat efficiency.

Further, if using the supercharging action of the supercharger to make the pressure inside the intake pipe rise to make the amount of intake air fed into a combustion chamber increase, the temperature in the combustion chamber when the piston is at compression top dead center (compression end temperature) rises and knocking easily occurs. However, according to the first aspect, the actual compression ratio is made to fall, so even if the compression end temperature rises, the occurrence of knocking can be suppressed.

In a second aspect of the present invention, at the time of engine medium load operation, until the pressure inside the intake pipe reaches a limit pressure beyond which the pressure cannot be raised further due to the structure of the intake pipe or the ability of the supercharger, the higher the engine load becomes, the lower the actual compression ratio is made.

In a third aspect of the present invention, in a region higher in load than the engine load when the pressure inside the intake pipe reaches the limit pressure, the amount of intake air fed into a combustion chamber is controlled by changing the closing timing of the intake valve.

In a fourth aspect of the present invention, in a region higher in load than the engine load when the pressure inside the intake pipe reaches the limit pressure, a throttle valve is held in a fully open state.

In a fifth aspect of the present invention, in a region of a load lower than the engine load when the pressure inside the intake pipe reaches the limit pressure, the amount of intake air fed into a combustion chamber is controlled by changing an opening degree of a throttle valve.

In a sixth aspect of the present invention, in a medium load operating region of a load lower than the engine load when the pressure inside the intake pipe reaches the limit pressure, the closing timing of the intake valve is between 115° ABDC and 130° ABDC.

In a seventh aspect of the present invention, in a medium load operating region of a load lower than the engine load when the pressure inside the intake pipe reaches the limit pressure, the closing timing of the intake valve is set based on an engine load and a cooling efficiency of an intercooler.

In an eighth aspect of the present invention, in a medium load operating region of a load lower than the engine load when the pressure inside the intake pipe reaches the limit pressure, the closing timing of the intake valve is held substantially constant without regard to the engine load.

In a ninth aspect of the present invention, in a medium load operating region of a load lower than the engine load when the pressure inside the intake pipe reaches the limit pressure, the closing timing of the intake valve is held within 10° without regard to the engine load.

In a 10th aspect of the present invention, in a medium load operating region of a load lower than the engine load when the pressure inside the intake pipe reaches the limit pressure, as the cooling efficiency of the intercooler becomes higher, the closing timing of the intake valve is retarded.

In an 11th aspect of the present invention, as the supercharger, a variable volume type turbocharger able to change volume between a large volume side and a small volume side is used, and the volume of the variable volume type turbocharger is made to be set to the large volume side in the region higher in speed than the engine speed beyond which the supercharging pressure cannot be raised any further due to the structure of the intake pipe when the variable volume type turbocharger is used at the large volume side.

In a 12th aspect of the present invention, at the time of engine low load operation, the mechanical compression ratio is made the maximum mechanical compression ratio.

In a 13th aspect of the present invention, at the time of engine low load operation, the expansion ratio is made 20 or more.

Below, the present invention can be understood much more from the attached drawings and the description of the preferred embodiments.

BRIEF DESCRIPTION OF DRAWINGS

FIG. 7 is a view showing the relationship between a theoretical heat efficiency and the expansion ratio.

FIG. 8A and FIG. 8B are views for explaining an ordinary cycle and superhigh expansion ratio cycle.

FIG. 9 is a view showing changes in the mechanical compression ratio etc. according to the engine load.

DESCRIPTION OF EMBODIMENTS

Figure 1:
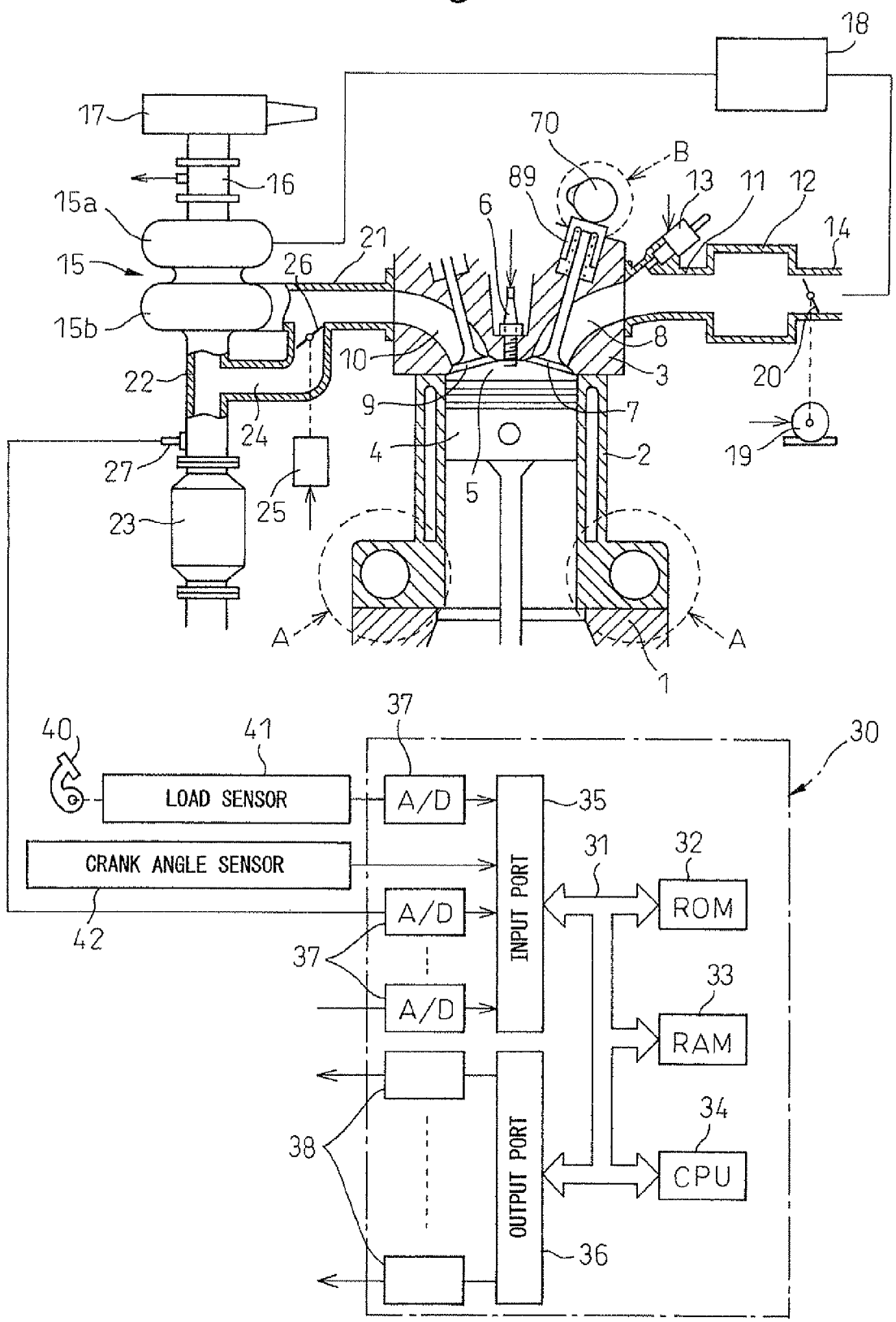
FIG. 1 is an overall view of a spark ignition type internal combustion engine.

Below, an embodiment of the present invention will be explained in detail with reference to the drawings. Note that, in the following explanation, similar component elements are assigned the same reference numerals.

FIG. 1 is side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the center of a top surface of the combustion chamber 5, 7 an intake valve, 8 an intake port, 9 an exhaust valve, and 10 an exhaust port. The intake ports 8 are connected through intake branch pipes 11 to a surge tank 12. The intake branch pipes 11 have fuel injectors 13 arranged in them for injecting fuel toward corresponding intake ports 8. Note that, the fuel injectors 13 may also be arranged inside the combustion chambers 5 instead of being attached to the intake branch pipes 11.

The surge tank 12 is connected through an intake duct 14 to an outlet of a compressor 15a of an exhaust turbocharger 15, while an inlet of the compressor 15a is connected through an intake air detector 16 for detecting an intake air amount to an air cleaner 17. In the intake duct 14, an intercooler 18 is provided. In the intake duct 14 downstream of the intercooler 18, a throttle valve 20 driven by an actuator 19 is arranged. Note that, in the present embodiment, as a supercharger for supercharging the air fed into the combustion chambers 5, the example is shown of use of an exhaust turbocharger, but instead of an exhaust turbocharger, it is also possible to use various other superchargers. Further, in the following explanation, the part of the intake duct 14 downstream of the throttle valve 20, surge tank 12, intake branch pipe 11, and intake port 8 are referred to all together as the "intake pipe".

On the other hand, the exhaust port 10 is connected through an exhaust manifold 21 to an inlet of an exhaust turbine 15b of an exhaust turbocharger 15, while an outlet of the exhaust turbine 15b is connected through an exhaust pipe 22 to a catalytic converter 23 housing for example a three-way catalyst. The exhaust manifold 21 and the exhaust pipe 22 are connected by an exhaust bypass passage 24 bypassing the exhaust turbine 15b. Inside this exhaust bypass passage 24, a bypass control valve 26 driven by an actuator 25 is arranged. Note that, at the entrance of the catalytic converter 23, an air-fuel ratio sensor 27 is arranged.

On the other hand, in the embodiment shown in FIG. 1, at a connecting part of the crank case 1 and cylinder block 2, a variable compression ratio mechanism A is provided which can change a relative position of the crank case 1 and cylinder block 2 in the cylinder axial direction so as to change the volume of a combustion chamber 5 when a piston 4 is positioned at compression top dead center. Furthermore, a variable valve timing mechanism B is provided which can change a closing timing of an intake valve 7.

An electronic control unit 30 is comprised of a digital computer which is provided with components connected with each other by a bidirectional bus 31 such as a ROM (read only memory) 32, RAM (random access memory) 33, CPU (microprocessor) 34, input port 35, and output port 36. An output signal of the intake air detector 16 and an output signal of the air-fuel ratio sensor 27 are input through respectively corresponding AD converters 37 to the input port 35. Further, an accelerator pedal 40 is connected to a load sensor 41 which generates an output voltage proportional to the amount of depression of the accelerator pedal 40. The output voltage of the load sensor 41 is input through a corresponding AD converter 37, to the input port 35. Furthermore, the input port 35 has a crank angle sensor 42 which generates an output pulse every time the crankshaft rotates by for example 10° connected to it. On the other hand, the output port 36 is connected through corresponding drive circuits 38 to the spark plugs 6, fuel injectors 13, throttle valve drive-use actuator 19, bypass drive-use actuator 25, variable compression ratio mechanism A, and variable valve timing mechanism B.

Figure 2:
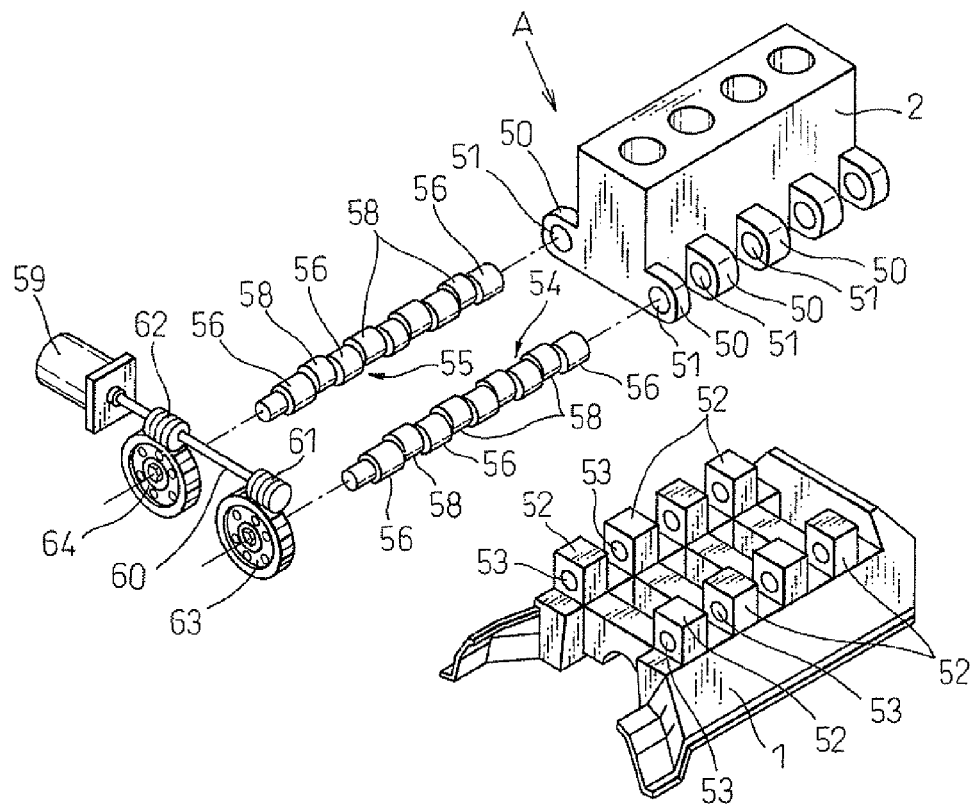
FIG. 2 is a disassembled perspective view of a variable compression ratio mechanism.
Figures 3A, 3B:
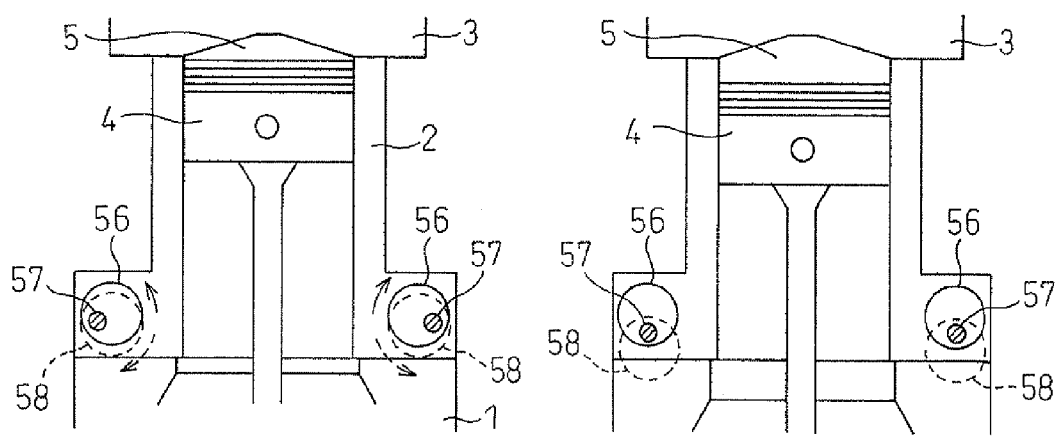
FIG. 3A and FIG. 3B are side cross-sectional views of a schematically illustrated internal combustion engine.

FIG. 2 is a disassembled perspective view of the variable compression ratio mechanism A shown in FIG. 1, while FIG. 3A and FIG. 3B are side cross-sectional views of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, eccentric shafts 57 extend between the circular cams 56, and the eccentric shafts 57 are arranged eccentrically with respect to the axes of rotation of the cam shafts 54, 55 as shown by the hatching in FIG. 3A and FIG. 35. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions from each other as shown by the solid line arrows in FIG. 3A from the state shown in FIG. 3A, the eccentric shafts 57 move toward the bottom center, so the circular cams 58 rotate in the opposite directions from the circular cams 56 in the cam insertion holes 53 as shown by the broken line arrows in FIG. 3A. When the eccentric shafts 57 move toward the bottom center as shown in FIG. 3B, the centers of the circular cams 58 move to below the eccentric shafts 57.

As will be understood from a comparison of FIG. 3A and FIG. 3B, the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves farther away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55, respectively. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
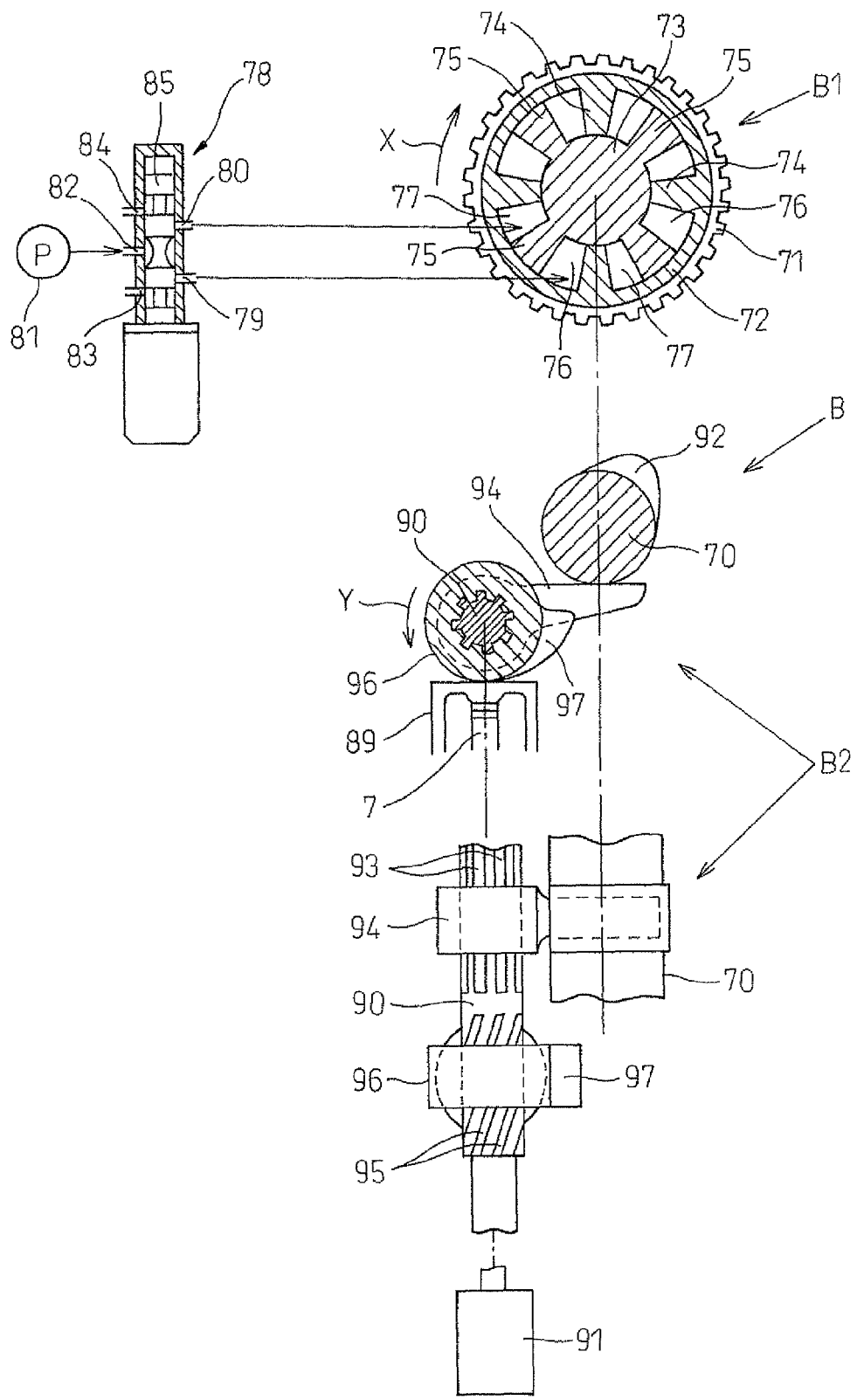
FIG. 4 is a view showing a variable valve timing mechanism.

On the other hand, FIG. 4 shows a variable valve timing mechanism B attached to the cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam working angle changer B2 arranged between the cam shaft 70 and the valve lifter 26 of the intake valve 7 and changing the working angle of the cams of the cam shaft 70 to different working angles for transmission to the intake valve 7. Note that FIG. 4 is a side sectional view and plan view of the cam working angle changer B2.

First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, 84.

To advance the phase of the cams of the cam shaft 70, in FIG. 4, the spool valve 85 is made to move to downward, working oil fed from the feed port 82 is fed through the hydraulic port 79 to the advancing use hydraulic chambers 76, and working oil in the retarding use hydraulic chambers 77 is drained from the drain port 84. At this time, the shaft 73 is made to rotate relative to the cylindrical housing 72 in the arrow X-direction.

As opposed to this, to retard the phase of the cam of the cam shaft 70, in FIG. 4, the spool valve 85 is made to move upward, working oil fed from the feed port 82 is fed through the hydraulic port 80 to the retarding use hydraulic chambers 77, and working oil in the advancing use hydraulic chambers 76 is drained from the drain port 83. At this time, the shaft 73 is made to rotate relative to the cylindrical housing 72 in the direction opposite to the arrows X.

Figure 5A:
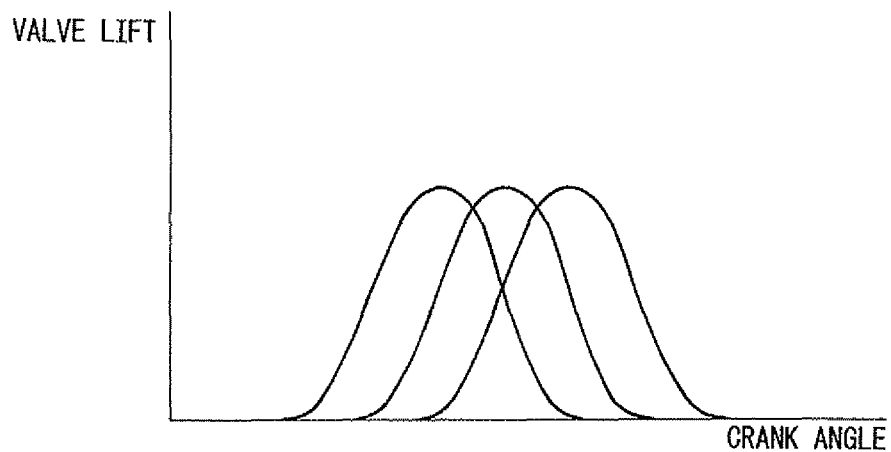
FIG. 5A and FIG. 5B are views showing the amounts of lift of an intake valve and an exhaust valve.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount as shown in FIG. 5A That is, the cam phase changer B1 can freely advance or retard the opening timing of the intake valve 7.

Next, explaining the cam working angle changer B2 of the intake variable valve timing mechanism B, this cam working angle changer B2 is provided with a control rod 90 arranged in parallel with the cam shaft 70 and made to move by an actuator 91 in the axial direction, an intermediate cam 94 engaging with a cam 92 of the cam shaft 70 and slidingly fitting with a spline 93 formed on the control rod 90 and extending in the axial direction, and a pivoting cam 96 engaging with a valve lifter 26 for driving the intake valve 7 and slidingly fitting with a spline 95 extending in a spiral formed on the control rod 90. The pivoting cam 96 is formed with a cam 97.

When the cam shaft 70 rotates, the cam 92 causes the intermediate cam 94 to pivot by exactly a constant angle at all times. At this time, the pivoting cam 96 is also made to pivot by exactly a constant angle. On the other hand, the intermediate cam 94 and pivoting cam 96 are supported not movably in the axial direction of the control rod 90, therefore when the control rod 90 is made to move by the actuator 91 in the axial direction, the pivoting cam 96 is made to rotate relative to the intermediate cam 94.

Figure 5B:
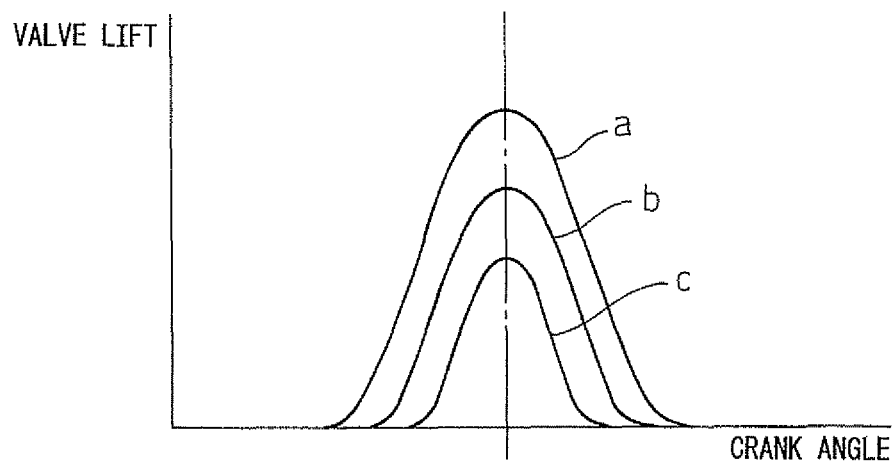

In the case where the cam 97 of the pivoting cam 96 starts to engage with the valve lifter 26 when the cam 92 of the cam shaft 70 starts to engage with the intermediate cam 94 due to the relative rotational positional relationship between the intermediate cam 94 and pivoting cam 96, as shown by a in FIG. 5B, the opening time period and amount of lift of the intake valve 7 become maximum. As opposed to this, when the actuator 91 is used to make the pivoting cam 96 rotate relative to the intermediate cam 94 in the arrow Y-direction of FIG. 4, the cam 92 of the cam shaft 70 engages with the intermediate cam 94, then after a while the cam 97 of the pivoting cam 96 engages with the valve lifter 24. In this case, as shown by b in FIG. 5B, the opening time period and amount of lift of the intake valve 7 become smaller than a.

When the pivoting cam 96 is made to rotate relative to the intermediate cam 94 in the arrow Y-direction of FIG. 4, as shown by c in FIG. 5B, the opening time period and amount of lift of the intake valve 7 become further smaller. That is, by using the actuator 91 to change the relative rotational position of the intermediate cam 94 and pivoting cam 96, the opening time period (working angle) of the intake valve 7 can be freely changed. However, in this case, the amount of the lift of the intake valve 7 becomes smaller as the opening time period of the intake valve 7 becomes shorter.

The cam phase changer B1 can be used to freely change the opening timing of the intake valve 7 and the cam working angle changer B2 can be used to freely change the opening time period of the intake valve 7 in this way, so both the cam phase changer B1 and cam working angle changer B2, that is, the variable valve timing mechanism B, may be used to freely change the opening timing and opening time period of the intake valve 7, that is, the opening timing and closing timing of the intake valve 7.

Note that the variable valve timing mechanism B shown in FIG. 1 and FIG. 4 show an example. It is also possible to use various types of variable valve timing mechanisms other than the example shown in FIG. 1 and FIG. 4. In particular, in this embodiment according to the present invention, so long as a closing timing mechanism which can change the closing timing of an intake valve 7, any type of mechanism may be used. Further, for the exhaust valves 9 as well, a variable valve timing mechanism similar to the variable valve timing mechanism B of the intake valve 7 may be provided.

Figure 6A:
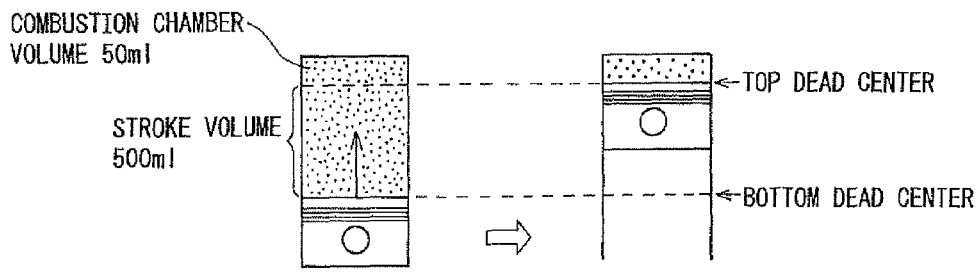
FIG. 6A to FIG. 6C are views for explaining a mechanical compression ratio, actual compression ratio, and expansion ratio.
Figure 6B:
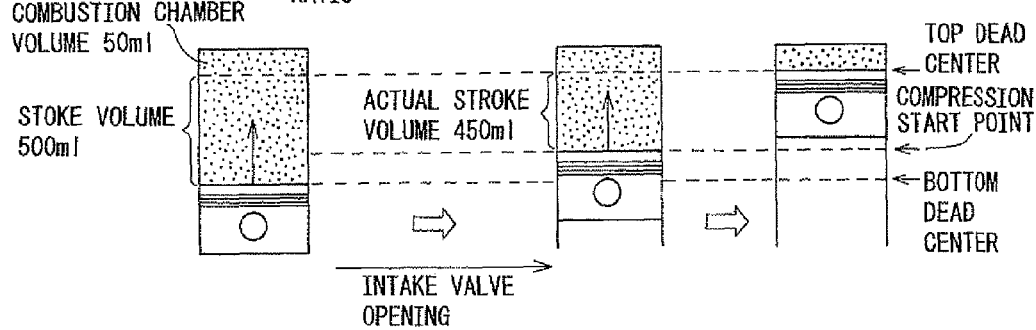
Figure 6C:
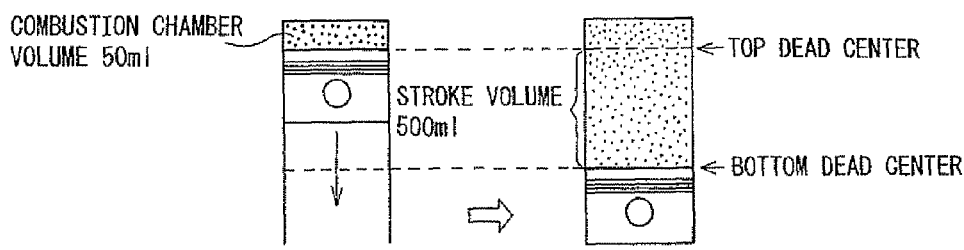

Next, the meaning of the terms used in the present application will be explained with reference to FIG. 6A to FIG. 6C. Note that FIG. 6A to FIG. 6C show for explanatory purposes an engine with a volume of the combustion chambers of 50 ml and a stroke volume of the piston of 500 ml. In these FIG. 6A to FIG. 6C, the combustion chamber volume shows the volume of the combustion chamber when the piston is at compression top dead center.

FIG. 6A explains the mechanical compression ratio. The mechanical compression ratio is a value determined mechanically from the stroke volume of the piston at the time of a compression stroke and combustion chamber volume. This mechanical compression ratio is expressed by (combustion chamber volume+stroke volume)/combustion chamber volume. In the example shown in FIG. 6A, this mechanical compression ratio becomes (50 ml+500 ml)/50 ml=11.

FIG. 6B explains the actual combustion ratio. This actual combustion ratio is a value determined from the actual stroke volume of the piston from when the compression action is actually started to when the piston reaches top dead center and the combustion chamber volume. This actual combustion ratio is expressed by (combustion chamber volume+actual stroke volume)/combustion chamber volume. That is, as shown in FIG. 6B, even if the piston starts to rise in the compression stroke, no compression action is performed while the intake valve is opened. The actual compression action is started after the intake valve closes. Therefore, the actual combustion ratio is expressed as follows using the actual stroke volume. In the example shown in FIG. 6B, the actual combustion ratio becomes (50 ml+450 ml)/50 ml=10.

FIG. 6C explains the expansion ratio. The expansion ratio is a value determined from the stroke volume of the piston at the time of an expansion stroke and value determined from the combustion chamber volume. This expansion ratio is expressed by the (combustion chamber volume+stroke volume)/combustion chamber volume. In the example shown in FIG. 6C, this expansion ratio becomes (50 ml+500 ml)/50 ml=11.

Next, the most basic features of the present invention will be explained with reference to FIG. 7, FIG. 8A, and FIG. 8B. Note that FIG. 7 shows the relationship between the theoretical heat efficiency and the expansion ratio, while FIG. 8A and FIG. 8B show a comparison between the ordinary cycle and superhigh expansion ratio cycle used selectively in accordance with the load in the present invention.

FIG. 8A shows the ordinary cycle wherein the intake valve closes near the bottom dead center and the compression action by the piston is started from near substantially compression bottom dead center. In the example shown in this FIG. 8A as well, in the same way as the examples shown in FIG. 6A to FIG. 6C, the combustion chamber volume is made 50 ml, and the stroke volume of the piston is made 500 ml. As will be understood from FIG. 8A, in an ordinary cycle, the mechanical compression ratio is (50 ml+500 ml)/50 ml=11, the actual combustion ratio is also about 11, and the expansion ratio also becomes (50 ml+500 ml)/50 ml=11. That is, in an ordinary internal combustion engine, the mechanical compression ratio and actual combustion ratio and the expansion ratio become substantially equal.

The solid line in FIG. 7 shows the change in the theoretical heat efficiency in the case where the actual combustion ratio and expansion ratio are substantially equal, that is, in the ordinary cycle. In this case, it is learned that the larger the expansion ratio, that is, the higher the actual combustion ratio, the higher the theoretical heat efficiency. Therefore, in an ordinary cycle, to raise the theoretical heat efficiency, the actual combustion ratio should be made higher. However, due to the restrictions on the occurrence of knocking at the time of engine high load operation, the actual combustion ratio can only be raised even at the maximum to about 12, accordingly, in an ordinary cycle, the theoretical heat efficiency cannot be made sufficiently high.

On the other hand, under this situation, the inventors strictly differentiated between the mechanical compression ratio and actual combustion ratio and studied the theoretical heat efficiency and as a result discovered that in the theoretical heat efficiency, the expansion ratio is dominant, and the theoretical heat efficiency is not affected much at all by the actual combustion ratio. That is, if raising the actual combustion ratio, the explosive force rises, but compression requires a large energy, accordingly even if raising the actual combustion ratio, the theoretical heat efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical heat efficiency becomes. The broken line of $\epsilon=10$ in FIG. 7 shows the theoretical heat efficiency in the case of fixing the actual combustion ratio at 10 and raising the expansion ratio in that state. In this way, it is learned that the amount of rise of the theoretical heat efficiency when raising the expansion ratio in the state where the actual combustion ratio is maintained at a low value and the amount of rise of the theoretical heat efficiency in the case where the actual combustion ratio is increased along with the expansion ratio as shown by the solid line of FIG. 7 will not differ that much.

If the actual combustion ratio is maintained at a low value in this way, knocking will not occur, therefore if raising the expansion ratio in the state where the actual combustion ratio is maintained at a low value, the occurrence of knocking can be prevented and the theoretical heat efficiency can be greatly raised. FIG. 8B shows an example of the case when using the variable compression ratio mechanism A and variable valve timing mechanism B to maintain the actual combustion ratio at a low value and raise the expansion ratio.

Referring to FIG. 8B, in this example, the variable compression ratio mechanism A is used to lower the combustion chamber volume from 50 ml to 20 ml. On the other hand, the intake variable valve timing mechanism B is used to retard the closing timing of the intake valve until the actual stroke volume of the piston changes from 500 ml to 200 ml. As a result, in this example, the actual combustion ratio becomes (20 ml+200 ml)/20 ml=11 and the expansion ratio becomes (20 ml+500 ml)/20 ml=26. In the ordinary cycle shown in FIG. 8A, as explained above, the actual combustion ratio is about 11 and the expansion ratio is 11. Compared with this case, in the case shown in FIG. 8B, it is learned that only the expansion ratio is raised to 26. This will be called the "superhigh expansion ratio cycle" below.

As explained above, generally speaking, in an internal combustion engine, the lower the engine load, the worse the heat efficiency, therefore to improve the heat efficiency at the time of vehicle operation, that is, to improve the fuel efficiency, it becomes necessary to improve the heat efficiency at the time of engine low load operation. On the other hand, in the superhigh expansion ratio cycle shown in FIG. 8B, the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8B is set, while at the time of engine high load operation, the ordinary cycle shown in FIG. 8A is set. This is the basic feature of the present invention.

Next, the operational control as a whole will be explained with reference to FIG. 9.

FIG. 9 shows the changes, in accordance with the engine load at a certain engine speed, of the mechanical compression ratio, closing timing of an intake valve 7, actual compression ratio, the pressure inside the intake pipe, the opening degree of the throttle valve 20, and the intake air amount. In particular, the solid lines in FIG. 9 show the changes in the different parameters in a spark ignition type internal combustion engine provided with an exhaust turbocharger 15 like in this embodiment of the present invention, while the broken lines in FIG. 9 show the changes in the different parameters in a spark ignition type internal combustion engine not provided with an exhaust turbocharger 15 or other supercharger.

Note that, in the illustrated example, to enable the three-way catalyst in the catalytic converter 23 to simultaneously reduce the unburned hydrocarbons (unburned HC), carbon monoxide (CO), and nitrogen oxides ($NO_x$) in the exhaust gas, normally the average air-fuel ratio in a combustion chamber 5 is feedback controlled based on the output signal of the air-fuel ratio sensor 27 to the stoichiometric air-fuel ratio.

First, the operational control of a spark ignition type internal combustion engine not provided with an exhaust turbocharger 15 or other supercharger shown by the broken line in FIG. 9 will be explained.

In a spark ignition type internal combustion engine provided with a supercharger, as explained above, at the time of engine high load operation, the ordinary cycle shown in FIG. 8A is performed. Therefore, as shown by the broken line in FIG. 9, at this time, the mechanical compression ratio is made lower, so the expansion ratio is low, and the closing timing of the intake valve 7 is advanced. Further, at this time, the intake air amount is large. At this time, the opening degree of the throttle valve 20 is held fully open or substantially fully open.

On the other hand, as shown by the broken line in FIG. 9, if the engine load becomes lower, along with this, the closing timing of the intake valve 7 is retarded so as to reduce the intake air amount. Further, at this time, to enable the actual compression ratio to be held substantially constant, as shown by the broken line in FIG. 9, as the engine load becomes lower, the mechanical compression ratio is increased, therefore, as the engine load becomes lower, the expansion ratio is also increased. Note that, at this time as well, the throttle valve 20 is held in the fully open or substantially fully open state. Therefore, the amount of intake air fed into the combustion chamber 5 is controlled, without using the throttle valve 20, by changing the closing timing of the intake valve 7.

In this way, when the engine load becomes lower than the engine high load operating state, under a substantially constant actual compression ratio, as the intake air amount is decreased, the mechanical compression ratio is made to increase. That is, proportional to the reduction of the intake air amount, the volume of a combustion chamber 5 when the piston 4 reaches compression top dead center is decreased. Therefore, the volume of the combustion chamber 5 when the piston 4 reaches compression top dead center changes proportionally to the intake air amount. Note that, since, at this time, the air-fuel ratio in the combustion chamber 5 becomes the stoichiometric air-fuel ratio, the volume of the combustion chamber 5 when the piston 4 reaches compression top dead center changes proportionally to the amount of fuel.

If the engine load becomes further lower, the mechanical compression ratio is made to further increase. If the engine load falls to $L_1$, the mechanical compression ratio reaches the limit mechanical compression ratio which corresponds to the limit due to the structure of the combustion chamber 5. When the mechanical compression ratio reaches the limit mechanical compression ratio, in a region of a load lower than the engine load $L_1$ when the mechanical compression ratio reaches the limit mechanical compression ratio, the mechanical compression ratio is held at the limit mechanical compression ratio. Therefore, in a region of a load lower than the engine load $L_1$, the mechanical compression ratio becomes maximum and thus the expansion ratio also becomes maximum. In other words, in the region of a load lower than the engine load $L_1$, the mechanical compression ratio is made maximum so that the maximum expansion ratio is obtained.

Further, in the example shown by the broken lines in FIG. 9, as the engine load becomes lower from the engine high load operating state, the closing timing of the intake valve 7 is retarded. If the engine load falls to $L_1$, the closing timing of the intake valve 7 becomes the limit closing timing enabling control of the amount of intake air fed into the combustion chamber 5. If the closing timing of the intake valve 7 reaches the limit closing timing, in a region of a load lower than the engine load $L_1$ when the closing timing of the intake valve 7 reaches the limit closing timing, the closing timing of the intake valve 7 is held at the limit closing timing.

When the closing timing of the intake valve 7 is held at the limit closing timing, it will no longer be possible to control the intake air amount by change of the closing timing of the intake valve 7. In the example shown by the broken line in FIG. 9, at this time, that is, in a region of a load lower than the engine load $L_1$ when the closing timing of the intake valve 7 reaches the limit closing timing, the throttle valve 20 is used to control the amount of intake air fed into a combustion chamber 5. However, if the throttle valve 20 is used for control of the intake air amount, as shown in FIG. 9, the pumping loss increases.

Note that, if the throttle valve 20 is used for control of the intake air amount, the pumping loss increases. Therefore, to prevent the occurrence of such pumping loss, in a region of a load lower than the engine load $L_1$ when the closing timing of the intake valve 7 reaches the limit closing timing, it is possible to hold the throttle valve 20 fully open or substantially fully open and in that state increase the air-fuel ratio the lower the engine load. At this time, the fuel injector 13 is preferably arranged in a combustion chamber 5 for causing layered combustion. Alternatively, in a region of a load lower than the engine load $L_1$ when the closing timing of the intake valve 7 reaches the limit closing timing, it is also possible to hold the throttle valve 20 fully open or substantially fully open and in that state increase the opening degree of the EGR valve the lower the engine load.

Further, in the above example, the engine load when the mechanical compression ratio reaches the limit mechanical compression ratio and the engine load when the closing timing of the intake valve 7 reaches the limit closing timing are the same engine load $L_1$, but the engine load when the mechanical compression ratio reaches the limit mechanical compression ratio need not be the same as the engine load when the closing timing of the intake valve 7 reaches the limit closing timing. For example, when the engine load when the mechanical compression ratio reaches the limit mechanical compression ratio is higher than the engine load when the closing timing of the intake valve 7 reaches the limit closing timing, in the period from when the mechanical compression ratio reaches the limit mechanical compression ratio to when the closing timing of the intake valve 7 reaches the limit closing timing, only the closing timing of the intake valve 7 is retarded, so as the engine load becomes lower, the actual compression ratio is reduced.

Further, if the engine speed becomes higher, disturbance occurs in the air-fuel mixture in the combustion chamber 5, so knocking becomes harder to occur. Therefore, in this embodiment according to the present invention, the higher the engine speed, the higher the actual compression ratio is made.

Furthermore, as explained above, in the superhigh expansion ratio cycle shown in FIG. 8B, the expansion ratio is made 26. The higher this expansion ratio, the better. However, in the range of the actual compression ratio where practical use is possible ($\epsilon$= about 5 to about 13), the expansion ratio where the maximum theoretical heat efficiency is obtained is 20 or more, so in the present invention, the variable compression ratio mechanism A is formed so that the expansion ratio becomes 20 or more.

Further, in the example shown by the broken lines in FIG. 9, the mechanical compression ratio is continuously changed in accordance with the engine load. However, the mechanical compression ratio can also be made to change step-wise in accordance with the engine load.

Furthermore, when making the closing timing of the intake valve 7 a timing at a retarded side from intake bottom dead center, the intake air amount can be controlled by advancing the closing timing of the intake valve 7 as the engine load becomes lower. Therefore, expressing control of the closing timing of the intake valve 7 all together, as the engine load becomes lower, the closing timing of the intake valve 7 can be made to move in a direction away from compression bottom dead center until the limit closing timing in which the amount of intake air fed into a combustion chamber 5 can be controlled, as the engine load becomes lower.

Next, the operational control in this embodiment of the present invention shown by the solid lines in FIG. 9, that is, the operational control of a spark ignition type internal combustion engine provided with an exhaust turbocharger 15 or other supercharger, will be explained.

Even in a spark ignition type internal combustion engine provided with a supercharger, at the time of engine low load operation, the superhigh expansion ratio cycle shown in FIG. 8B is performed. Therefore, as shown by the solid line in FIG. 9, at the time of engine low load operation, the mechanical compression ratio is held at the limit mechanical compression ratio which becomes the limit due to the structure of the combustion chamber 5. On the other hand, as shown by the solid line in FIG. 9, the closing timing of the intake valve 7 is made the timing at the most retarded side which the intake valve 7 can take, that is, the limit closing timing enabling control of the amount of intake air fed into a combustion chamber 5. Due to this, at the time of engine low load operation, the superhigh expansion ratio cycle is performed. In particular, in this embodiment according to the present invention, the mechanical compression ratio is held at the limit mechanical compression ratio across the engine low load operating region and the closing timing of the intake valve 7 is held at the limit closing timing, so the actual compression ratio is also held constant.

Further, at the time of engine low load operation, the closing timing of the intake valve 7 cannot be used to control the amount of intake air fed into a combustion chamber 5, so in this embodiment according to the present invention, the throttle valve 20 is used to control the amount of intake air fed into the combustion chamber 5. Therefore, at the time of engine low load operation, as shown in FIG. 9, as the engine load becomes higher, the opening degree of the throttle valve 20 is made larger. Due to this, as the engine load becomes higher, the pressure in the intake pipe (the intake duct 14 downstream of the throttle valve 20, the surge tank 12, intake branch pipe 11, intake port 8 upstream of the intake valve 7) is made to increase and, along with this, the amount of intake air fed into the combustion chamber 5 is made to increase.

Note that, at the time of engine low load operation, even in the case providing a supercharger as shown by the solid line in FIG. 9, similar control is performed as when not providing a supercharger as shown by the broken line in FIG. 9. However, when providing a supercharger such as in this embodiment of the present invention, compared with the case of not providing a supercharger, the supercharging action of the supercharger causes the pressure inside the intake pipe when the opening degree of the throttle valve 20 is the same to become higher. For this reason, in this embodiment according to the present invention, at the time of engine low load operation, compared with the case of not providing a supercharger, the opening degree of the throttle valve 20 is made smaller.

On the other hand, when the engine load becomes further higher, the compressor 15a of the exhaust turbocharger 15 is used to supercharge the air fed into a combustion chamber 5. As shown by the solid line in FIG. 9, the pressure inside the intake pipe gradually rises. At the engine load $L_1$, the pressure inside the intake pipe becomes atmospheric pressure. In this embodiment according to the present invention, even if the load becomes higher than the engine load $L_1$ at which the pressure inside the intake pipe can become higher than atmospheric pressure, as shown by the solid line in FIG. 9, the closing timing of the intake valve 7 is held as it is near the limit closing timing. Therefore, in the region of a load higher than the engine load $L_1$ at which the pressure inside the intake pipe becomes atmospheric pressure, the closing timing of the intake valve 7 cannot be used to control the amount of intake air fed into the combustion chamber 5, so the throttle valve 20 is used to control the amount of intake air fed into the combustion chamber 5. Therefore, even when the load becomes higher than the engine load $L_1$ at which the pressure inside the intake pipe becomes atmospheric pressure, the opening degree of the throttle valve 20 is made larger as the engine load becomes higher.

On the other hand, if the pressure inside the intake pipe becomes the atmospheric pressure or more, when the intake valve 7 is closed, a combustion chamber 5 is fed with high temperature air raised in temperature by the supercharging. As a result, the temperature inside the combustion chamber 5 when the piston 4 reaches compression top dead center (compression end temperature) becomes higher and, therefore, knocking becomes easier to occur. For this reason, in this embodiment according to the present invention, as shown by the solid line in FIG. 9, when the load becomes higher than the engine load $L_1$ where the pressure inside the intake pipe becomes atmospheric pressure, the mechanical compression ratio is made to decrease as the engine load becomes higher. As explained above, even if the load becomes higher than the engine load $L_1$ where the pressure inside the intake pipe becomes the atmospheric pressure, the closing timing of the intake valve 7 is held near the limit closing timing, so along with the drop in the mechanical compression ratio, the actual compression ratio is lowered. Due to this, the occurrence of knocking can be suppressed.

That is, according to this embodiment of the present invention, at the time of engine medium load operation when the load becomes higher than the engine load $L_1$ where the pressure inside the intake pipe becomes atmospheric pressure, compared with at the time of engine low load operation, mainly the compressor 15a of the exhaust turbocharger 15 is used to raise the pressure inside the intake pipe and thereby increase the amount of intake air fed into a combustion chamber 5. In other words, according to this embodiment of the present invention, at the time of engine medium load operation where the load is higher than the engine load $L_1$, the amount of intake air fed into a combustion chamber 5 is basically not increased by advancing the closing timing of the intake valve 7.

Further, according to this embodiment of the present invention, at the time of engine medium load operation where the load is higher than the engine load $L_1$ where the pressure inside the intake pipe becomes the atmospheric pressure, compared with at the time of engine low load operation, mainly the mechanical compression ratio is lowered to make the actual compression ratio drop. In other words, at the time of engine medium load operation when the load is higher than the engine load $L_1$ as well, basically the actual compression ratio does not fall by advancing the closing timing of the intake valve 7.

In the engine medium load operating region, if increasing the opening degree of the throttle valve 20 as the engine load becomes higher, the pressure inside the intake pipe reaches the limit pressure above which the pressure cannot be raised due to the structure of the intake pipe (that is, the pressure at which the possibility of inviting bursting of the intake pipe if further increasing the pressure inside the intake pipe becomes high). If the pressure inside the intake pipe reaches the limit pressure, in the region of a load higher than the engine load $L_2$ at which the pressure inside the intake pipe becomes the limit pressure, the pressure inside the intake pipe is held at the limit pressure.

If the pressure inside the intake pipe is held at the limit pressure, it will no longer be possible to raise the pressure inside the intake pipe to increase the amount of intake air fed into a combustion chamber 5. Therefore, in this embodiment according to the present invention, as shown by the solid line in FIG. 9, in the region of a load higher than the engine load $L_2$ at which the pressure inside the intake pipe becomes the limit pressure, the closing timing of the intake valve 7 is used to control the amount of intake air fed into the combustion chamber 5. Therefore, in this region, as the engine load becomes higher, the closing timing of the intake valve 7 is made to advance.

On the other hand, in the region of a load higher than the engine load $L_2$ at which the pressure inside the intake pipe becomes the limit pressure, the pressure inside the intake pipe is held at the limit pressure. Therefore, the temperature of the air fed into a combustion chamber 5 is also held constant without being raised further by supercharging. For this reason, in the region of a load higher than the engine load $L_2$ at which the pressure inside the intake pipe becomes the limit pressure, knocking will not be further reduced. For this reason, the actual compression ratio is held constant. Further, in the region of a load higher than the engine load $L_2$, even if the closing timing of the intake valve 7 is advanced, the mechanical compression ratio is made lower as the engine load becomes higher so that the actual compression ratio becomes constant.

Note that, in the above embodiment, the pressure inside the intake pipe is increased until the limit pressure beyond which the pressure cannot be raised due to the structure of the intake pipe. However, depending on the exhaust turbocharger 15 or the structure of the intake pipe and engine speed, sometimes the pressure beyond which the pressure inside the intake pipe cannot be raised due to the ability of the exhaust turbocharger 15 (that is, the pressure beyond which the pressure cannot be raised even if fully closing the bypass control valve 26 and fully opening the throttle valve 20) will be lower than the pressure beyond which the pressure cannot be raised due to the structure of the intake pipe. In such a case, as the engine load becomes higher, the pressure inside the intake pipe is raised until the capacity limit pressure beyond which the pressure cannot be raised due to the ability of the exhaust turbocharger 15. In the region of an engine load higher than that, the pressure inside the intake pipe is held at the capacity limit pressure. In this case, in the region of a load higher than the engine load at which the pressure inside the intake pipe reaches the capacity limit pressure, as the engine load becomes higher, the closing timing of the intake valve 7 is advanced and the mechanical compression ratio is lowered.

Further, in the above embodiment, for comparison with a spark ignition type internal combustion engine not provided with a supercharger, the engine load where the pressure inside the intake pipe becomes atmospheric pressure is made an engine load $L_1$ the same as the engine load when the mechanical compression ratio reaches the limit mechanical compression ratio and the engine load when the closing timing of the intake valve 7 reaches the limit closing timing, but it does not necessarily have to be made the same engine load.

In this regard, as explained above, in a spark ignition type internal combustion engine not provided with a supercharger, in the range from the engine load $L_1$ where the pressure inside the intake pipe becomes atmospheric pressure to the engine load $L_2$ where the pressure inside the intake pipe reaches the limit pressure, as the engine load becomes higher, the closing timing of the intake valve 7 is made to advance so as to increase the amount of intake air fed into a combustion chamber 5 and the mechanical compression ratio is made to fall so as to maintain the actual compression ratio constant.

As opposed to this, in a spark ignition type internal combustion engine of the present embodiment of the present invention provided with an exhaust turbocharger 15, in the range from the engine load $L_1$ where the pressure inside the intake pipe becomes atmospheric pressure to the engine load $L_2$ where the pressure inside the intake pipe becomes the limit pressure, the closing timing of the intake valve 7 is held near the limit closing timing without regard to the engine load. In addition, as the engine load becomes higher, the actual compression ratio is made to fall. Along with this, the mechanical compression ratio is made to fall.

Here, as shown in FIG. 9, in the region of a load higher than the engine load $L_1$, in a spark ignition type internal combustion engine of this embodiment of the present invention provided with an exhaust turbocharger 15, compared with a spark ignition type internal combustion engine not provided with a supercharger, the mechanical compression ratio is made higher and the actual compression ratio is made slightly lower. As explained above, to improve the heat efficiency, rather than raising the actual compression ratio, the method of raising the mechanical compression ratio, that is, expansion ratio, is more effective. For this reason, in this embodiment according to the present invention, in the region of a higher load than the engine load $L_1$, it is possible to make the heat efficiency extremely high. Below, this will also be explained in further detail.

Figure 10:
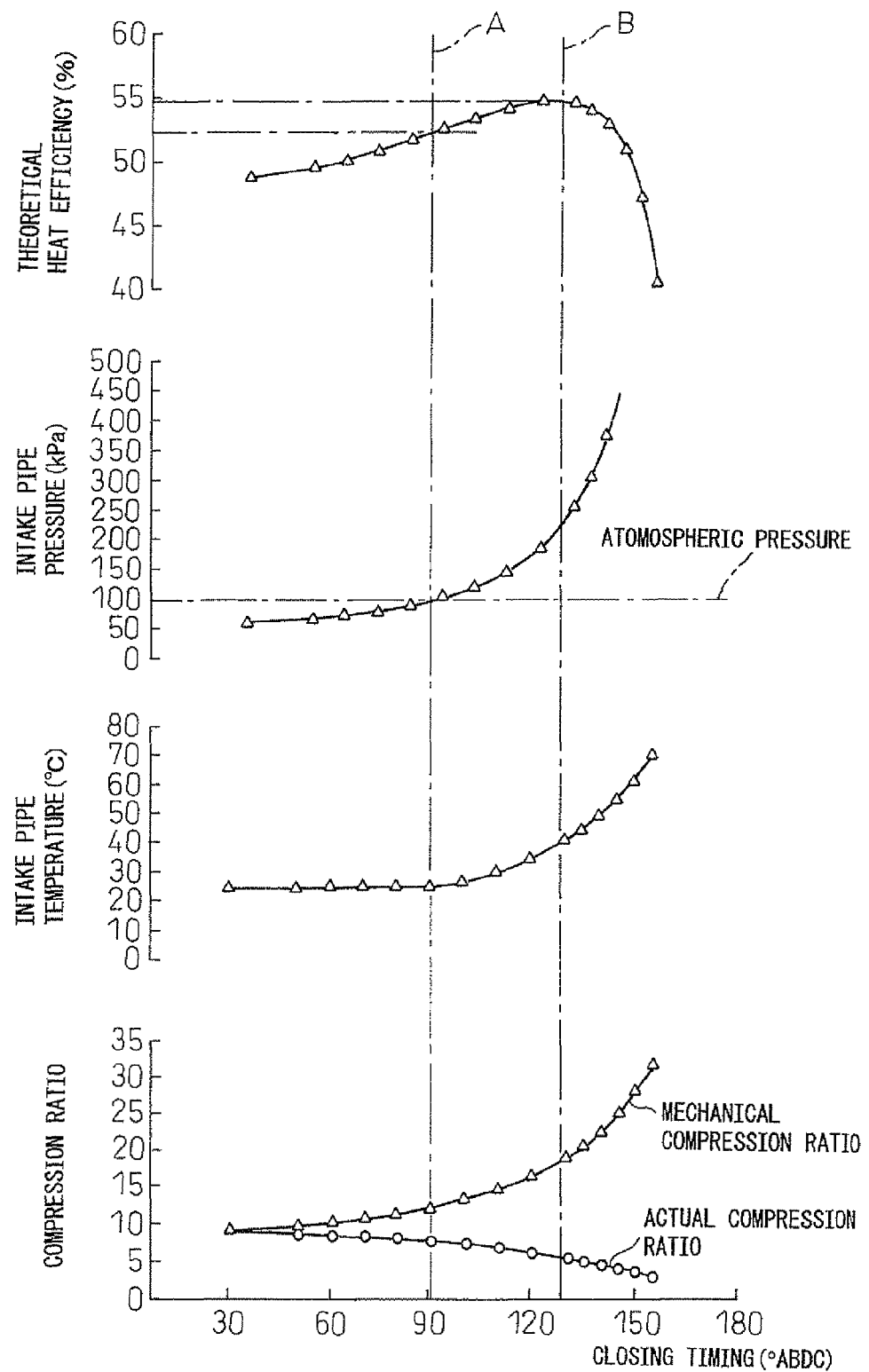
FIG. 10 is a view showing changes in the pressure inside the intake pipe etc. in accordance with the closing timing of the intake valve.

FIG. 10 shows the results of a desktop study of the changes in various parameters in accordance with the closing timing of the intake valve 7 such as the pressure inside the intake pipe, the temperature inside the intake pipe, the compression ratio, and the theoretical heat efficiency in the case of holding the extent of knocking constant. In the example shown in FIG. 10, the changes in the case of making the charging efficiency of the air fed into a combustion chamber 5 60% and making the cooling efficiency of the intercooler 18 (below, referred to as the "IC efficiency") 80% are shown. Here, the "IC efficiency $\eta_{IC}$" shows the cooling efficiency of the compressed air by the intercooler 18. If making the temperature of the air at the entrance of the intercooler 18 $T_{in}$, the temperature of the air at the exit of the intercooler 18 $T_{out}$, and the air temperature $T_{air}$, it is expressed by the following formula (1).

$$\eta_{IC}=(T_{in}-T_{out})/(T_{in}-T_{air}) \tag{1}$$

The theoretical heat efficiency at each closing timing of the intake valve 7 was calculated as follows. First, the pressure inside the intake pipe was calculated to give a charging efficiency of 60% based on the closing timing of the intake valve 7, then the temperature inside the intake pipe was calculated to give an IC efficiency of 80% based on the pressure inside the intake pipe. Based on the thus calculated pressure inside the intake pipe, temperature inside the intake pipe, and closing timing of the intake valve 7, the actual compression ratio where the degree of knocking becomes a predetermined degree, specifically, when the integral at compression top dead center in Livengood-Wu integration calculated for each closing timing of the intake valve 7 becomes a certain constant value, is calculated. The mechanical compression ratio is calculated based on the thus calculated actual compression ratio and closing timing of the intake valve 7. After this, the theoretical heat efficiency is calculated based on the thus calculated mechanical compression ratio, actual compression ratio, closing timing of the intake valve 7, pressure inside the intake pipe, and temperature inside the intake pipe.

As shown in FIG. 10, under conditions of a charging efficiency of 60% and an IC efficiency of 80%, the closing timing of the intake valve 7 becomes the maximum at the closing timing B near 120° ABDC. On the other hand, in the case of a spark ignition type internal combustion engine not provided with a supercharger, the pressure inside the intake pipe does not become the atmospheric pressure or more, so the closing timing of the intake valve 7 becomes the maximum at the closing timing A near 90° ABDC. Therefore, it is learned that the theoretical heat efficiency when using an exhaust turbocharger 20 or other supercharger to raise the pressure inside the intake pipe (that is, the pressure of the air fed into a combustion chamber 5) becomes higher than the theoretical heat efficiency when not using a supercharger. Therefore, in this embodiment according to the present invention using an exhaust turbocharger 20, a high heat efficiency can be obtained.

In this regard, in the above explanation, in the engine load region from the engine load $L_1$ where the pressure inside the intake pipe becomes the atmospheric pressure to the engine load $L_2$ where the pressure inside the intake pipe reaches the limit pressure, the closing timing of the intake valve 7 is held near the limit closing timing. However, in this embodiment according to the present invention, specifically, the closing timing of the intake valve 7 is controlled in accordance with the engine load and IC efficiency.

Figure 11:
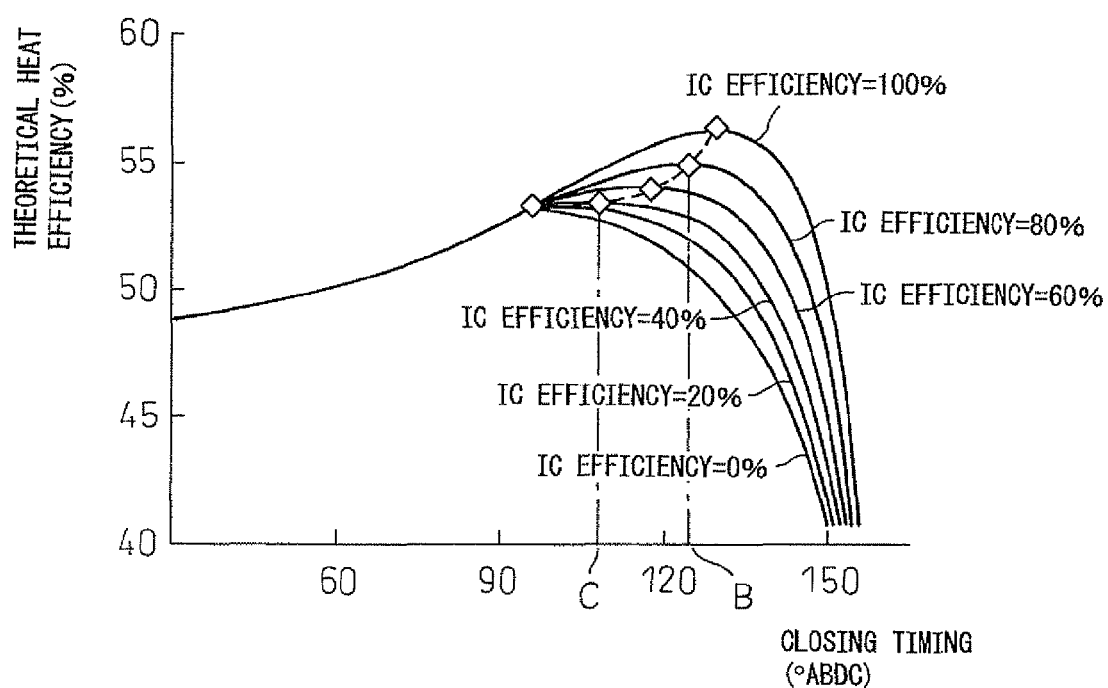
FIG. 11 is a view showing the relationship of the closing timing of the intake valve and heat efficiency.

FIG. 11 is a view showing the results of a desktop study of the relationship between the closing timing of the intake valve 7 and the heat efficiency at a certain engine load (charging efficiency 60). The trend in the theoretical heat efficiency with respect to the closing timing of the intake valve 7 when the IC efficiency is 80% is the same as the case shown in FIG. 10.

As will be explained from FIG. 11, if the closing timing of the intake valve 7 is retarded from the advanced side timing, regardless of the IC efficiency, the theoretical heat efficiency initially gradually rises, reaches a peak at a certain closing timing, then falls. Here, the closing timing of the intake valve 7 when the theoretical heat efficiency peaks differs according to the IC efficiency as plotted in FIG. 11. Specifically, as shown in FIG. 11, the higher the IC efficiency, the more retarded the closing timing of the intake valve 7 where the theoretical heat efficiency becomes maximum. Such a trend is similar not only at a certain engine load shown in FIG. 11, but also at other engine loads in the engine medium load operating region, in particular from the engine load $L_1$ where the pressure inside the intake pipe becomes the atmospheric pressure, to the engine load $L_2$ where the pressure inside the intake pipe reaches the limit pressure.

Therefore, in this embodiment according to the present invention, at the time of engine medium load operation from the engine load $L_1$ where the pressure inside the intake pipe becomes the atmospheric pressure to the engine load $L_2$ where the pressure inside the intake pipe reaches the limit pressure, the closing timing of the intake valve 7 is set so that the theoretical heat efficiency becomes maximum in accordance with the engine load and IC efficiency. For example, in the example shown in FIG. 11, when the charging efficiency is 60% and the IC efficiency is 80%, the closing timing of the intake valve 7 is made the timing B, while when the charging efficiency is 60% and the IC efficiency is 20%, the closing timing of the intake valve 7 is made the timing C.

Figure 12:
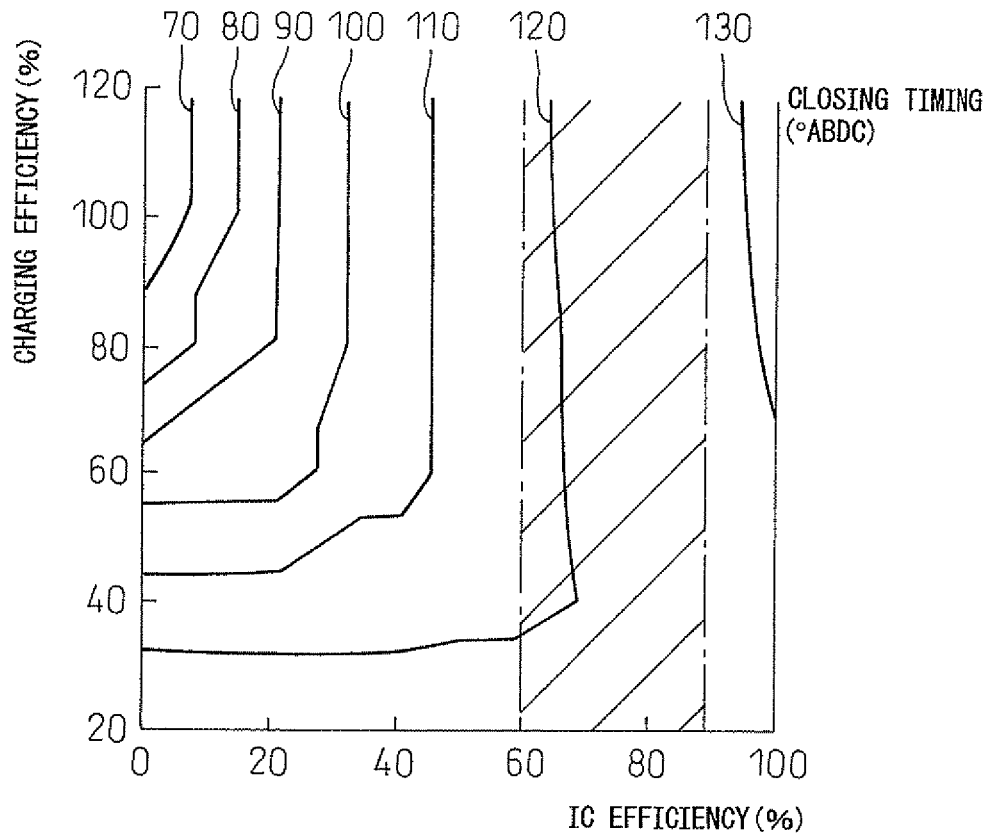
FIG. 12 is a view showing the relationship between the charging efficiency and IC efficiency, and the closing timing of the intake valve where the theoretical heat efficiency becomes maximum.

FIG. 12 is a view showing the relationship between the charging efficiency (engine load) and IC efficiency, and the closing timing of the intake valve 7 calculated based on these charging efficiency and IC efficiency so that the theoretical heat efficiency becomes maximum. As shown in FIG. 12, the closing timing of the intake valve 7 where the theoretical heat efficiency becomes maximum basically becomes more advanced the higher the charging efficiency, that is, the higher the engine load, and further the higher the IC efficiency.

Here, in the case of using a general intercooler, at the time of normal engine operation, the IC efficiency normally becomes 60 to 90% or so. That is, when using a general intercooler, the region which an internal combustion engine can actually take can be said to be the region shown by the hatching in FIG. 12.

Further, in the region shown by the hatching in this FIG. 12, the closing timing of the intake valve 7 is 115 to 130° ABDC. That is, when the IC efficiency is the practical region of 60 to 90%, the closing timing of the intake valve 7 where the theoretical heat efficiency becomes maximum becomes a range of 115 to 130° ABDC at all engine loads. Therefore, in this embodiment according to the present invention, in particular, at the time of engine medium load operation, the closing timing of the intake valve 7 is made 115 to 130° ABDC.

Furthermore, as will be understood from FIG. 12, in the region of an IC efficiency of 60 to 90%, the closing timing of the intake valve 7 where the theoretical heat efficiency becomes maximum becomes substantially constant at the time when the charging efficiency is 40% or more, that is, at the time of engine medium and high load operation, regardless of the charging efficiency (that is, engine load). Therefore, in this embodiment according to the present invention, at the time of engine medium load operation, the closing timing of the intake valve 7 is made substantially constant regardless of the engine load. However, the closing timing of the intake valve 7 at the time of engine medium load operation is made to change in accordance with the IC efficiency. Note that, "substantially constant" specifically is made within a range of 10° or less, preferably a range of 5° or less.

Note that, in this embodiment according to the present invention, the IC efficiency is calculated using the above formula (1) based on a temperature sensor (not shown) and an air temperature sensor (not shown) provided upstream and downstream of the intercooler 18.

Figure 13:
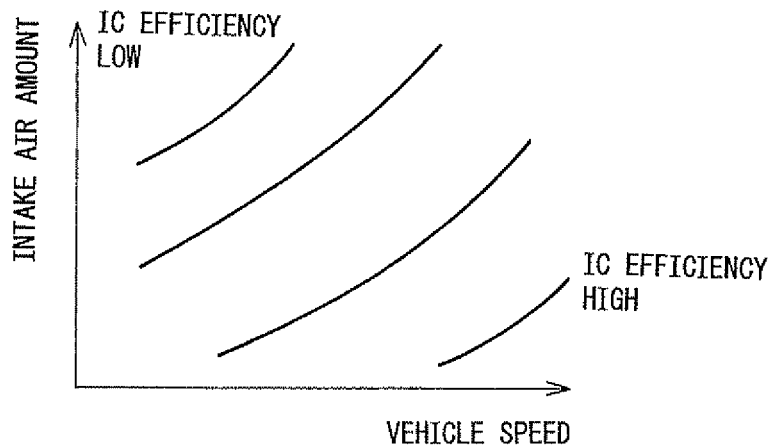
FIG. 13 is a view showing the relationship between the vehicle speed and intake air amount and the IC efficiency.

Further, the IC efficiency becomes higher the faster the speed of the vehicle since the amount of air striking the intercooler 18 becomes greater. Further, it becomes lower the greater the intake air amount since the period during which the compressed air is cooled in the intercooler 18 becomes shorter. Therefore, instead of using the above sensors to calculate the IC efficiency, it is also possible to use a map such as shown in FIG. 13 to calculate the IC efficiency based on the speed of the vehicle mounting the spark ignition type internal combustion engine and the intake air amount. Further, in calculating the IC efficiency, instead of the intake air amount, it is also possible to use the engine load and the engine speed.

Further, in the above embodiment, in the engine low load operation region of a load lower than the engine load $L_1$ where the pressure inside the intake pipe becomes the atmospheric pressure, the closing timing of the intake valve 7 is held at the limit closing timing, while in the engine medium load operating region from the engine load $L_1$ to the engine load $L_2$ when the pressure inside the intake pipe reaches the limit pressure, as explained above, the closing timing of the intake valve 7 is held at a certain closing timing set in accordance with the IC efficiency, that is, another closing timing separate from the limit closing timing. However, in the engine medium and low load operating region up to the engine load $L_2$ when the pressure inside the intake pipe reaches the limit pressure, the closing timing of the intake valve 7 may be held at the limit closing timing or at a substantially constant timing near the limit closing timing. In this case as well, a relatively high heat efficiency is obtained and engine control is made easier.

Figure 14:
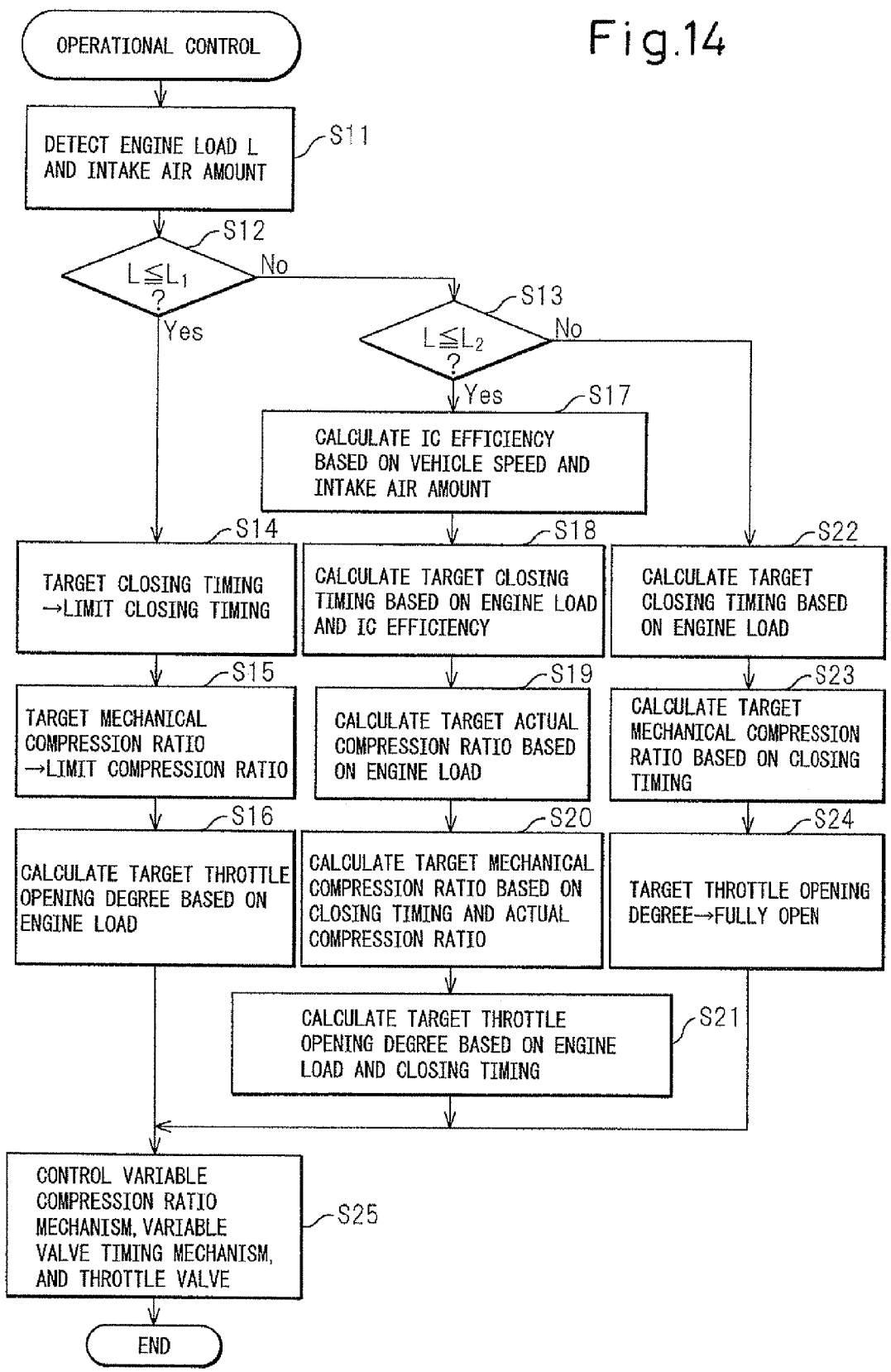
FIG. 14 is a flowchart showing a control routine of operational control of an internal combustion engine.

FIG. 14 is a flowchart showing the control routine in operational control of a spark ignition type internal combustion engine of this embodiment according to the present invention. Referring to FIG. 14, first, at step S11, the engine load L is detected based on the output of the load sensor 41 and the amount of intake air is detected based on the output of the intake air detector 16. Next, at steps S12 and S13, it is determined in which region the engine load L detected at step S11 is in, that is, the region lower than the load $L_1$, the region from the load $L_1$ to the load $L_2$, or the region higher than the load $L_2$.

When it is determined at steps S12 and S13 that the engine load L is in the region lower than the load $L_1$, the routine proceeds to step S14. At step S14, the target closing timing of the intake valve 7 is made the limit closing timing. Next, at step S15, the target mechanical compression ratio is made the limit mechanical compression ratio. Next, at step S16, based on the engine load L, the target throttle opening degree is calculated so that the amount of intake air fed into the combustion chamber 5 becomes an intake air amount in accordance with the engine load L. After this, the routine proceeds to step S25.

On the other hand, when it is determined at steps S12 and S13 that the engine load is in a region higher than the load $L_1$ and lower than the load $L_2$, the routine proceeds to step S17. At step S17, based on the speed of the vehicle mounting the internal combustion engine and the intake air amount detected at step S11, the IC efficiency is calculated using the map shown in FIG. 13. Next, at step S18, based on the engine load L detected at step S11 and the IC efficiency calculated at step S17, a map such as shown in FIG. 12 is used to calculate the target closing timing of the intake valve 7. Next, at step S19, the target actual compression ratio is calculated in accordance with the engine load L, then at step 20, the target mechanical compression ratio is calculated based on the target closing timing of the intake valve 7 calculated at step S18 and the target actual compression ratio calculated at step S19. Next, at step S21, the target throttle opening degree is calculated based on the engine load L and the target closing timing of the intake valve 7 so that the amount of intake air fed into a combustion chamber 5 becomes the intake air amount in accordance with the engine load L. After this, the routine proceeds to step S25.

Furthermore, when it is determined at steps S12 and S13 that the engine load is in a region higher than the load $L_2$, the routine proceeds to step S22. At step S22, the target closing timing of the intake valve 7 is calculated based on the engine load L. In particular, when the engine load is in a region higher than the load $L_2$, the opening degree of the throttle valve 20 is made fully open, so the target closing timing of the intake valve 7 is calculated so that the amount of intake air fed into a combustion chamber 5 becomes an amount of intake air in accordance with the engine load L. Next, at step S23, the target mechanical compression ratio is calculated based on the target closing timing of the intake valve 7 calculated at step S22 so that the actual compression ratio becomes a predetermined constant actual compression ratio. At step S24, the target throttle opening degree is made fully open, then the routine proceeds to step S25.

At step S25, the variable valve timing mechanism B is controlled so as to give the target closing timing of the intake valve 7 calculated at step S14, S19, or S22, the variable compression ratio mechanism A is controlled so as to give the target mechanical compression ratio calculated at step S15, S20, or S23, and the actuator 19 of the throttle valve 20 is controlled so as to give the target throttle opening degree calculated at step S16, S21, or S24, then the control routine is ended.

In this regard, in this embodiment according to the present invention, as the exhaust turbocharger 15, it is possible to use not only a usual exhaust turbocharger, but also a variable volume type turbocharger. Below, the case of use of a variable volume type turbocharger as the exhaust turbocharger 15 will be explained.

The variable volume type turbocharger 15 is a turbocharger which can switch between a small volume mode with a small volume of the turbocharger and a large volume mode with a large volume of the turbocharger. When the variable volume type turbocharger 15 is set to the small volume mode, even when the pressure, temperature, flow rate, etc. of the exhaust gas exhausted from the combustion chamber 5 are low, sufficient supercharging of the intake air can be performed, but when the pressure, temperature, flow rate, etc. of the exhaust gas are high, the exhaust resistance by the turbocharger 15 ends up becoming high. On the other hand, when the variable volume turbocharger 15 is set to the large volume mode, even when the pressure, temperature, flow rate, etc. of the exhaust gas exhausted from a combustion chamber 5 are high, the rise in the exhaust resistance due to the turbocharger 15 can be suppressed, but when the pressure, temperature, flow rate, etc. of the exhaust gas are low, sufficient supercharging of the intake air cannot be performed.

Figure 15:
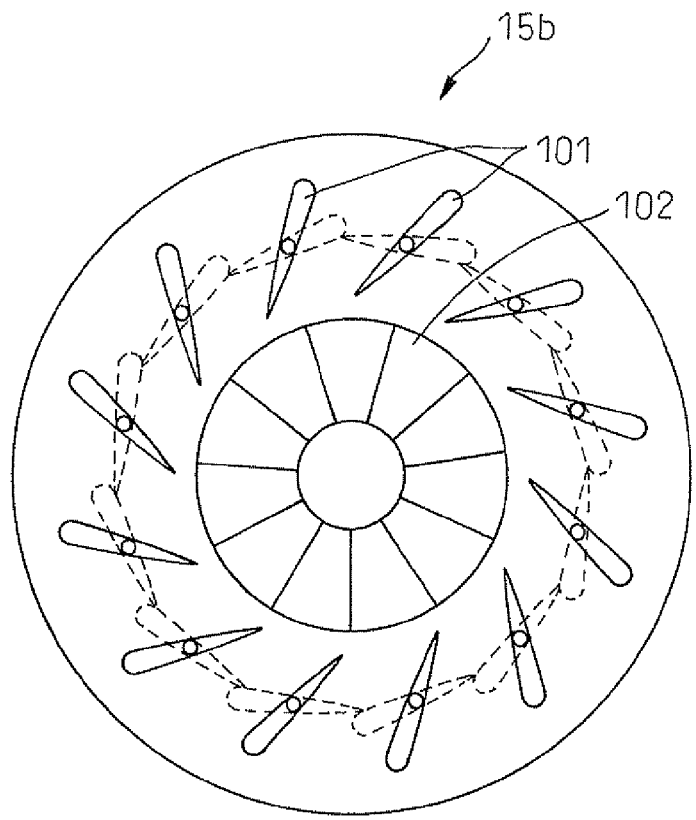
FIG. 15 is a view for explaining a variable nozzle turbocharger.

As an example of such a variable volume type turbocharger 15, for example, a variable nozzle turbocharger provided with nozzle vanes 101 such as shown in FIG. 15 may be mentioned. In the example shown in FIG. 15, the nozzle vanes 101 are provided around a turbine wheel 102 of the exhaust turbine 15*b* in a passage in which exhaust gas flows toward the turbine wheel 102. The variable nozzle turbocharger can switch between a large volume mode in which the directions of the nozzle vanes 101 are the directions such as shown by the solid lines in FIG. 15 to make the opening area wider and a small volume mode in which the directions of the nozzle vanes 101 are the directions such as shown by the broken lines in FIG. 15 to make the opening area narrower. That is, in a variable nozzle turbocharger, it is possible to change the directions of the nozzle vanes 101 to thereby switch the volume of the turbocharger.

Note that, as the variable volume type turbocharger 15, it is possible to use a sequential twin turbocharger or any other turbocharger so long as it can switch the volume of the turbocharger between a large volume mode and a small volume mode.

In this regard, in the present embodiment, as the engine load becomes higher, the pressure inside the intake pipe is raised to a limit pressure above which the pressure cannot be raised due to the structure of the intake pipe. In the region of the high engine load beyond that, the pressure inside the intake pipe is made the limit pressure and the pressure inside the intake pipe due to the supercharging is made as high as possible so as to realize a high heat efficiency.

However, when not using a variable volume type turbocharger like in the present embodiment, depending on the engine speed, the capacity limit pressure beyond which the pressure cannot be raised due to the ability of the exhaust turbocharger is sometimes lower than this limit pressure. In this case, the pressure inside the intake pipe due to the supercharging cannot be sufficiently raised and, as a result, the heat efficiency cannot be sufficiently raised.

Therefore, in the present embodiment, by using the variable volume type turbocharger 15, the supercharging pressure generated by the turbocharger 15 is maintained at the limit pressure from when the engine speed is low to when it is high.

Figure 16:
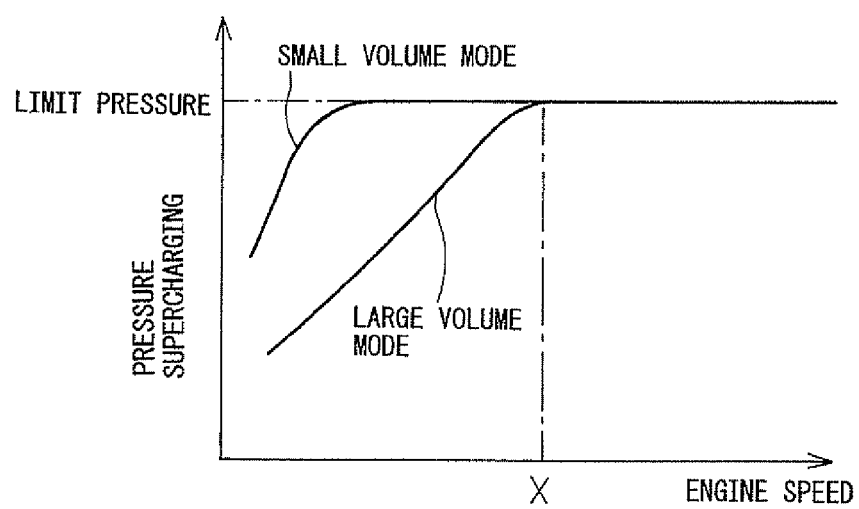
FIG. 16 is a view showing the relationship between engine speed and a supercharging pressure generated by a variable volume type turbocharger.

FIG. 16 is a view showing the relationship between the engine speed and the supercharging pressure generated by the variable volume type turbocharger 15. As shown in FIG. 16, when the variable volume type turbocharger 15 is set to the small volume mode, when the engine speed is low, the supercharging pressure is made high. On the other hand, when the variable volume type turbocharger 15 is set to the large volume mode, when the engine speed is low, the supercharging pressure is low. As the engine speed becomes higher, gradually the supercharging pressure rises and reaches the limit pressure at the engine speed X.

Therefore, in the present embodiment, when the engine speed is lower than the speed X, the variable volume type turbocharger 15 is set to the small volume mode, while when the engine speed is the speed X or more, the variable volume type turbocharger 15 is switched to the large volume mode. Due to this, the supercharging pressure can be maintained at the limit pressure from when the engine speed is low to when it is high. Due to this, the capacity limit pressure is prevented from becoming lower than the limit pressure and the heat efficiency can be constantly made high.

Note that, the switching point of the variable volume type turbocharger 15 from the small volume mode to the large volume mode can be made an engine speed higher than the speed X. However, in this case, if setting the variable volume type turbocharger 15 to the small volume mode at an engine speed higher than the speed X, the exhaust pressure ends up rising and deterioration of efficiency is invited. For this reason, the switching point of the variable volume type turbocharger 15 from the small volume side to the large volume side is preferably made the speed X.

Note that, the present invention was explained in detail based on specific embodiments, but a person skilled in the art could make various changes, corrections, etc. without departing from the scope of the claims and idea of the present invention.

REFERENCE SIGNS LIST

1 . . . crank case
2 . . . cylinder block

3 ... cylinder head
4 ... piston
5 ... combustion chamber
7 ... intake valve
15 ... exhaust turbocharger
18 ... intercooler
A ... variable compression ratio mechanism
B ... variable valve timing mechanism

The invention claimed is:

1. A spark ignition type internal combustion engine comprising:
    a variable compression ratio mechanism able to change a mechanical compression ratio,
    a variable valve timing mechanism able to control a closing timing of an intake valve, and
    a supercharger,
    wherein:
        at a time of engine low load operation at which a pressure inside an intake pipe is less than atmospheric pressure, the mechanical compression ratio is made higher compared with at a time of engine high load operation at which a pressure inside the intake pipe is at a limit pressure,
        at a time of engine medium load operation at which the pressure inside the intake pipe is at or above atmospheric pressure and below the limit pressure:
            the supercharging action of the supercharger is used to raise a pressure inside the intake pipe so that an amount of intake air fed into a combustion chamber is made to rise, compared with at the time of engine low load operation, and the mechanical compression ratio is made to fall so that the actual compression ratio is made to fall, and
            until the pressure inside the intake pipe reaches the limit pressure where the pressure cannot be raised further due to the structure of the intake pipe or the ability of the supercharger, the higher the engine load becomes, the lower the actual compression ratio is made.

2. The spark ignition type internal combustion engine as set forth in claim 1, wherein, in a region higher in load than the engine load when the pressure inside the intake pipe reaches the limit pressure, the amount of intake air fed into the combustion chamber is controlled by changing the closing timing of the intake valve.

3. The spark ignition type internal combustion engine as set forth in claim 2, wherein, in the region higher in load than the engine load when the pressure inside the intake pipe reaches the limit pressure, a throttle valve is held in the fully open state.

4. The spark ignition type internal combustion engine as set forth in claim 1, wherein, in a region of a load lower than the engine load when the pressure inside the intake pipe reaches the limit pressure, the amount of intake air fed into the combustion chamber is controlled by changing an opening degree of a throttle valve.

5. The spark ignition type internal combustion engine as set forth in claim 1, wherein, in a medium load operating region of a load lower than the engine load when the pressure inside the intake pipe reaches the limit pressure, the closing timing of the intake valve is made between 115° ABDC and 130° ABDC.

6. The spark ignition type internal combustion engine as set forth in claim 1, wherein, in a medium load operating region of a load lower than the engine load when the pressure inside the intake pipe reaches the limit pressure, the closing timing of the intake valve is set based on an engine load and a cooling efficiency of an intercooler.

7. The spark ignition type internal combustion engine as set forth in claim 1, wherein, in a medium load operating region of a load lower than the engine load when the pressure inside the intake pipe reaches the limit pressure, the closing timing of the intake valve is held substantially constant without regard to the engine load.

8. The spark ignition type internal combustion engine as set forth in claim 7, wherein, in a in the medium load operating region of a load lower than the engine load when the pressure inside the intake pipe reaches the limit pressure, as the cooling efficiency of the intercooler becomes higher, the closing timing of the intake valve is retarded.

9. The spark ignition type internal combustion engine as set forth in claim 1, wherein, in a medium load operating region of a load lower than the engine load when the pressure inside the intake pipe reaches the limit pressure, the closing timing of the intake valve is held within 10° without regard to the engine load.

10. The spark ignition type internal combustion engine as set forth in claim 1, wherein, as the supercharger, a variable volume type turbocharger able to change volume between a large volume side and a small volume side is used, and the volume of the variable volume type turbocharger is made to be set to the large volume side in the region higher in speed than the engine speed where the supercharging pressure cannot be raised any further due to the structure of the intake pipe when the variable volume type turbocharger is used at the large volume side.

11. The spark ignition type internal combustion engine as set forth in claim 1, wherein, at the time of engine low load operation, the mechanical compression ratio is made the maximum mechanical compression ratio.

12. The spark ignition type internal combustion engine as set forth in claim 1, wherein, at the time of engine low load operation, the expansion ratio is made 20 or more.

* * * * *